(12) United States Patent
Bajjuri et al.

(10) Patent No.: US 9,371,431 B2
(45) Date of Patent: Jun. 21, 2016

(54) POLY(ETHER SULFONE)S AND POLY(ETHER AMIDE SULFONE)S AND METHODS OF THEIR PREPARATION

(71) Applicant: International Business Machines Corporation, Armonk, NY (US)

(72) Inventors: Krishna M. Bajjuri, San Jose, CA (US); Jeannette M. Garcia, San Jose, CA (US); James L. Hedrick, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 14/321,877

(22) Filed: Jul. 2, 2014

(65) Prior Publication Data

US 2016/0002431 A1    Jan. 7, 2016

(51) Int. Cl.
| | | |
|---|---|---|
| C08G 75/00 | (2006.01) | |
| C08J 11/08 | (2006.01) | |
| C08G 75/30 | (2006.01) | |
| C08G 64/08 | (2006.01) | |
| C08G 75/23 | (2006.01) | |

(52) U.S. Cl.
CPC .............. *C08J 11/08* (2013.01); *C08G 64/081* (2013.01); *C08G 75/23* (2013.01); *C08G 75/30* (2013.01); *C08J 2369/00* (2013.01); *C08J 2381/06* (2013.01); *C08J 2381/10* (2013.01)

(58) Field of Classification Search
CPC .................................. C08G 75/23; C08K 7/24
See application file for complete search history.

(56) References Cited

U.S. PATENT DOCUMENTS

| | | | |
|---|---|---|---|
| 4,209,607 A | 6/1980 | Shalaby et al. | |
| 4,226,243 A | 10/1980 | Shalaby et al. | |
| 4,604,449 A | 8/1986 | Jackson, Jr. et al. | |
| 5,025,082 A | 6/1991 | Kishiro et al. | |
| 5,739,229 A | 4/1998 | Keoshkerian et al. | |
| 6,153,681 A | 11/2000 | Bekiarian | |
| 8,222,347 B2 | 7/2012 | Chakravarti et al. | |
| 2005/0027120 A1 | 2/2005 | Gojon-Zorrilla | |
| 2005/0214465 A1 | 9/2005 | Maskus et al. | |
| 2007/0117962 A1* | 5/2007 | Steiger .............. | C08G 65/4056 528/373 |
| 2007/0197739 A1 | 8/2007 | Aneja et al. | |
| 2008/0214743 A1 | 9/2008 | Broos et al. | |
| 2012/0141696 A1 | 6/2012 | Abad et al. | |

OTHER PUBLICATIONS

El-Hameed, "Aminolysis of polyethylene terephthalate waste as corrosion inhibitor for carbon steel in HCl corrosive medium," Advances in Applied Science Research, 2011, 2(3):483-499.

Fukushima, et al., "Advanced chemical recycling of poly(ethylene terephthalate) through organocatalytic aminolysis", Polym. Chem., 2013, 4, 1610.

Hedrick, "Poly(aryl ether amides)", Macromolecules, 1991, 24, 812-813.

Hedrick, et al., "Poly(aryl ether-phenylquinoxalines)", Macromolecules vol. 23, No. 6, Mar. 19, 1990, pp. 1561-1568.

(Continued)

*Primary Examiner* — Shane Fang
(74) *Attorney, Agent, or Firm* — Michael R. Roberts

(57) ABSTRACT

Poly(ether sulfones) (PES) and poly(ether amide sulfones) (PEAS) were prepared from post-consumer polycarbonates and polyesters, respectively, using a single vessel in batch mode (all reactants present when heating was initiated). The depolymerization of the initial polymer occurs concurrently with step growth polymerization to form a product polymer having a number average molecular weight of at least 5000.

17 Claims, 13 Drawing Sheets

(56) References Cited

OTHER PUBLICATIONS

Hedrick, et al., "Structural Modifications in Imide-Aryl Ether Phenylquinoxaline Random Copolymers", Journal of Polymer Science: Part A: Polymer Chemistry, vol. 30, pp. 105-110 (1992).
Lucas, et al., "Poly(aryl ether amides): Self polymerization of an A-B monomer via amide-activated ether synthesis", Polymer Bulletin 28, 129-133 (1992).
Mehdipour-Ataei, "Novel Thermally Stable Arylene Sulphone Ether Poly(amide-imide)," Iranian Polymer Journal / vol. 11 No. 4 (2002), pp. 251-256.
Mehdipour-Ataei, et al., "Novel Thermally Stable Poly(sulfone ether ester amide)s with Improved Solubility," e-Polymers 2006, No. 46, pp. 599-610.
Shukla, et al., "Aminolysis of polyethylene terephthalate waste", Polymer Degradation and Stability 91 (2006) 1850-1854.

* cited by examiner

POLY(ETHER SULFONE)S AND POLY(ETHER AMIDE SULFONE)S AND METHODS OF THEIR PREPARATION

BACKGROUND

The present invention relates to poly(ether sulfone)s and poly(ether amide sulfone)s and methods of their preparation, more specifically to poly(arylene ether sulfone)s and poly (arylene ether amide sulfone)s prepared from post-consumer polycarbonates and/or polyesters.

Current methods for recycling PET involve melting the thermoplastic and reformulating new products from the melt. This process is limited as to how many times it can be implemented because the recycling process progressively degrades the mechanical properties of the polymer.

Depolymerization of waste plastic bottles provides an abundant source of monomers for new materials. Recently, a depolymerization of PET catalyzed by a bifunctional catalyst, triazabicycloundecene (TBD), was used to form monomer bis(hydroxyethyl terephthalate) (BHET), which can be used to produce virgin PET. Generally, the nucleophilic agent (i.e., ethylene glycol) is employed in superstoichiometric amounts at high temperatures in order to achieve appreciable conversion to the desired BHET monomer.

An ongoing need exists for more efficient methods of recycling polyesters and polycarbonates.

SUMMARY

Accordingly, a poly(ether amide sulfone) (PEAS) is disclosed having a structure in accordance with formula (16):

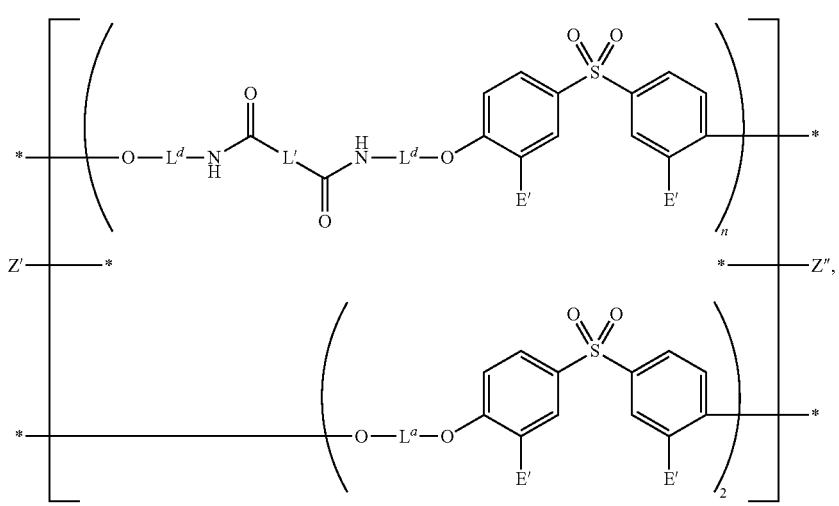

wherein
- $n$ is a positive number having an average value greater than or equal to 1,
- $m$ is a positive number having an average value greater than or equal to 1,
- each $E'$ is an independent monovalent radical selected from the group consisting of hydrogen and electron withdrawing groups,
- each $L^a$ is an independent divalent radical comprising 2 or more carbons,
- each $L^d$ is an independent divalent radical comprising 2 or more carbons,
- each $L'$ is an independent divalent linking group comprising 1 or more carbons,
- $Z'$ is a first polymer chain end group,
- $Z''$ is a second polymer chain end group, and
- vertical stacking of the repeat units enclosed by parentheses within the square brackets indicates a random distribution of the repeat units in the structure of the PEAS.

Also disclosed is a method, comprising:

forming a mixture comprising i) a polyester having a repeat unit of formula (8):

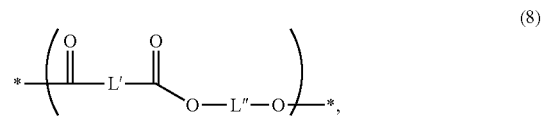

wherein
- $L'$ is a divalent radical comprising 1 or more carbons, and
- $L''$ is a divalent radical comprising 2 or more carbons, ii) an amino-alcohol of formula (10):

$$HO\text{-}L^d\text{-}NH_2 \qquad (10),$$

wherein
$L^d$ is a divalent radical comprising 2 or more carbons, iii) a bis-aryl sulfone of formula (4):

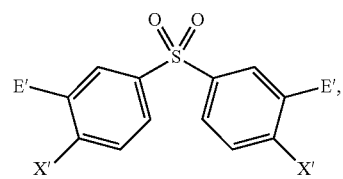

wherein
each E' is an independent monovalent radical selected from the group consisting of hydrogen and electron withdrawing groups, and
each X' is an independent monovalent leaving group,
iv) a diol compound of formula (1), HO-L-OH (1), wherein
$L^a$ is a divalent radical comprising 2 or more carbons,
v) a base, and
vi) a solvent; and
heating the mixture at a reaction temperature of about 150° C. to about 250° C., wherein the diol compound is substantially non-volatile at the reaction temperature, thereby forming a poly(ether amide sulfone) (PEAS).

Another method is disclosed, comprising:
forming a mixture comprising
i) a polycarbonate having a repeat unit of formula (2):

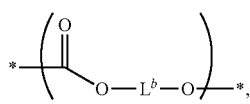 (2)

wherein
$L^b$ is a divalent radical comprising 2 or more carbons,
ii) a bis-aryl sulfone of formula (4):

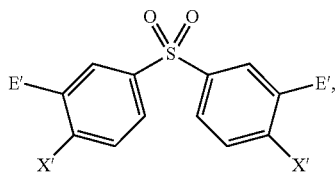 (4)

wherein
each E' is an independent monovalent radical selected from the group consisting of hydrogen and electron withdrawing groups, and
each X' is an independent monovalent leaving group,
iii) a base, and
iv) a solvent; and
heating the mixture at a reaction temperature of about 150° C. to about 250° C., thereby forming a poly(ether sulfone) (PES).

Also disclosed are molding compositions comprising an above-described polymer and one or more optional additives.

Further disclosed is a method, comprising:
forming a mixture comprising
i) an ester material comprising two ester groups,
ii) an amino-alcohol of formula (10):

HO-L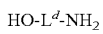-NH$_2$ (10), wherein
$L^d$ is a divalent radical comprising 2 or more carbons, iii) a bis-aryl sulfone of formula (4):

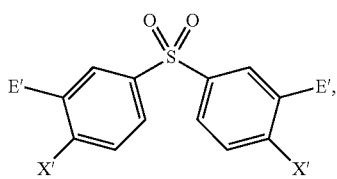 (4)

wherein
each E' is an independent monovalent radical selected from the group consisting of hydrogen and electron withdrawing groups, and
each X' is an independent monovalent leaving group,
iv) a diol compound of formula (1), HO-L-OH (1), wherein
$L^a$ is a divalent radical comprising 2 or more carbons,
v) a base, and
vi) a solvent; and
heating the mixture at a reaction temperature of about 150° C. to about 250° C., wherein the diol compound is substantially non-volatile at the reaction temperature, thereby forming a poly(ether amide sulfone) (PEAS).

The above-described and other features and advantages of the present invention will be appreciated and understood by those skilled in the art from the following detailed description, drawings, and appended claims.

DETAILED DESCRIPTION

Figure 1:
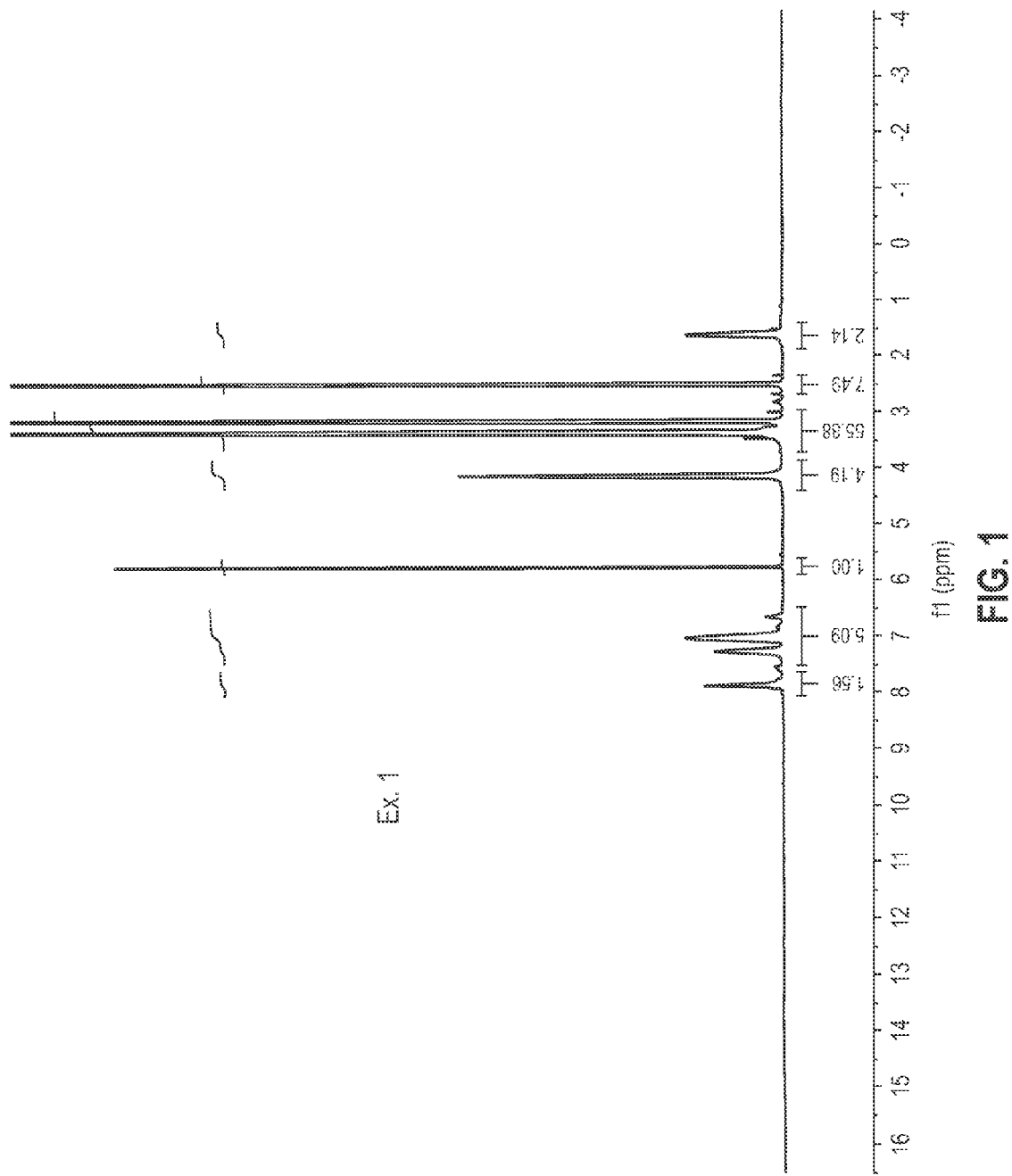
FIG. 1 is a $^1$H NMR spectrum of P-1 prepared from dimethyl terephthalate (DMT) and tyramine (Tyr, Example 1).

Disclosed are methods of forming poly(ether sulfone)s (PES) by a step growth polymerization starting from a carbonate material comprising two or more carbonate groups. The step growth polymerizations are conducted using a single vessel containing two or more polymerizable reactants. In an embodiment, one of the reactants is a polycarbonate that undergoes a depolymerization during the step growth polymerization.

Also disclosed are methods of forming poly(ether amide sulfone)s (PEAS) by a step growth polymerization starting from an ester material comprising two or more ester groups. The polymerizations are conducted using a single vessel containing four or more polymerizable reactants. In an embodiment, one of the reactants is a polyester that undergoes a depolymerization during the step growth polymerization. The formation of the PEAS involves concurrent formation of ether and amide linkages of the PEAS backbone.

The PES and/or PEAS product of the step growth polymerizations can have a number average molecular weight (Mn) of about 5,000 to about 1,000,000.

The ester material comprises two or more ester groups. These include compounds (e.g., dimethyl terephthalate), polyesters, and combinations thereof.

The carbonate material comprise two or more carbonate groups. These include compounds comprising two or more carbonate groups, polycarbonates, and combinations thereof.

Herein, polyesters and polycarbonates that are used as starting materials for the disclosed methods are also referred to as initial polymers. The initial polymer can be a first generation polymer (pre-consumer use) and/or a recycle polymer (post-consumer use). In an embodiment, the initial polymer is a post-consumer polymer.

In the following discussion, reference will be made to diol compounds (diols) and dioxy fragments of diol compounds. As an illustration, a diol compound can have a structure according to formula (1):

$$HO-L^a-OH \qquad (1),$$

wherein $L^a$ is a divalent radical comprising 2 or more carbons. The dioxy fragment of a diol compound of formula (1) is *—O-$L^a$-O—*. As a more specific example, the dioxy fragment of ethylene glycol (HO—CH$_2$CH$_2$—OH) is (*—O—CH$_2$CH$_2$—O—*). Herein, starred bonds represent attachment points, not methyl groups.

Exemplary non-limiting diol compounds include ethylene glycol, propylene glycol, 1,3-propanediol, 1,4-butanediol, 1,6-hexanediol, 1,12-dodecanediol, 2-ethyl-1,10-decanediol, 2-butene-1,4-diol, 1,3-cyclopentanediol, 1,3-cyclohexanediol, 1,4-cyclohexanediol, 1,3-cyclopentanediol, 1,3-cyclohexanediol, 1,4-cyclohexanediol, bis(hydroxymethyl)benzene, resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)difluoromethane, bis(4-hydroxyphenyl)diphenylmethane, bis(4-hydroxyphenyl)-1-naphthylmethane, 1,1-bis(4-hydroxyphenyl)ethane, 1,2-bis(4-hydroxyphenyl)ethane, 1,1-bis(4-hydroxyphenyl)-1-phenylethane, 2,2-bis(4-hydroxyphenyl)propane ("bisphenol A"), 2-(4-hydroxyphenyl)-2-(3-hydroxyphenyl)propane, 2,2-bis(4-hydroxyphenyl)butane, 1,1-bis(4-hydroxyphenyl)isobutane, 1,1-bis(4-hydroxyphenyl)cyclohexane, 1,1-bis(4-hydroxyphenyl)cyclododecane, trans-2,3-bis(4-hydroxyphenyl)-2-butene, 2,2-bis(4-hydroxyphenyl)adamantane, 2,2-bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(3,5-dimethyl-4-hydroxyphenyl)propane, 2,2-bis(2,3,5,6-tetramethyl-4-hydroxyphenyl)propane, 2,2-bis(3-5-dichloro-4-hydroxyphenyl)propane, 2,2-bis(3,5-dibromo-4-hydroxyphenyl)propane, 2,2-bis(2,6-dibromo-3,5-dimethyl-4-hydroxyphenyl)propane, α, α-bis(4-hydroxyphenyl)toluene, α,α,α',α'-tetramethyl-α,α'-bis(4-hydroxyphenyl)-p-xylene, 2,2-bis(4-hydroxyphenyl)hexafluoropropane, 1,1-dichloro-2,2-bis(4-hydroxyphenyl)ethylene, 1-dibromo-2,2-bis(4-hydroxypheny)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl) ether, bis(4-hydroxyphenyl)ether, bis(4-hydroxyphenyl) sulfide, bis(4-hydroxyphenyl)sulfoxide, bis(4-hydroxyphenyl) sulfone, bis(3,5-dimethyl-4-hydroxyphenyl) sulfone, 9,9-bis(4-hydroxyphenyl)fluorene, 2,7-dihydroxypyrene, 3,3-bis(4-hydroxyphenyl)phthalide, 2,6-dihydroxydibenzo-p-dioxin, 2,6-dihydroxythianthrene, 2,7-dihydroxyphenoxathiin, 2,7-dihydroxy-9,10-dimethylphenazine, 3,6-dihydroxydibenzofuran, 3,6-dihydroxydibenzothiophene, and 2,7-dihydroxycarbazole.

Poly(Ether Sulfone) (PES)

The reaction mixture for preparing a PES comprises a carbonate material comprising two or more carbonate groups, a bis-aryl sulfone, a base, and a solvent.

It should be understood that the carbonate material can be used singularly or in combination with one or more other carbonate materials, the bis-aryl sulfone can be used singularly or in combination with one or more other bis-aryl sulfones, the base can be used singularly or in combination with one or more other bases, and the solvent can be used singularly or in combination with one or more other solvents.

The reaction mixture to form a PES comprises the carbonate material and the bis-aryl sulfone in a molar ratio of about 1:1. When the carbonate material is a polymer, the amount of carbonate material can be based on the number average molecular weight (Mn) of the polymer.

The reaction mixture to form a PES comprises the base in an amount of about 1.05 molar equivalents relative to the bis-aryl sulfone.

The reaction mixture to form a PES is performed using a total solids concentration of about 15 wt % to about 25 wt % based on total weight of the reaction mixture.

Non-limiting examples of carbonate compounds comprising two carbonate groups include of catechol, resorcinol, hydroquinone, 4,4'-bis(hydroxyphenyl)methane, and bisphenol A. Non-limiting examples of dialkyl and diaryl dicarbonates of bisphenol A include:

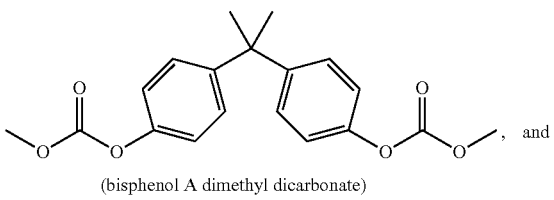

(bisphenol A dimethyl dicarbonate)

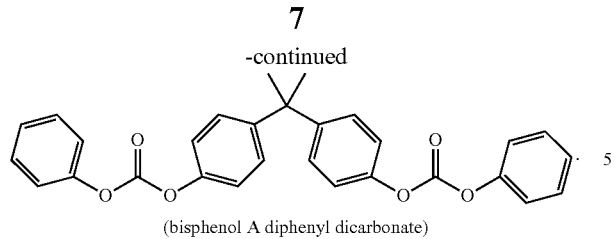

(bisphenol A diphenyl dicarbonate)

The carbonate material can be a polycarbonate. Non-limiting exemplary polycarbonates include those having a repeat unit represented by formula (2):

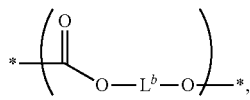
(2)

wherein $L^b$ is a divalent radical comprising 2 or more carbons.

Non-limiting polycarbonates include those having a structure represented by formula (3):

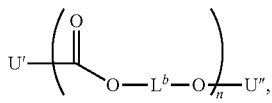
(3)

wherein
n is a positive number having an average value greater than 1,
$L^b$ is a divalent radical comprising 2 or more carbons,
U' is a first polymer chain end group, and
U" is a second polymer chain end group.

The fragment *—O—$L^b$—O—* of formula (2) is a dioxy fragment of a diol compound HO-$L^b$-OH. In a preferred embodiment, $L^b$ comprises at least one aromatic ring linked to at least one of the hydroxy groups.

A more specific polycarbonate is poly(bisphenol A carbonate) (PC-1), which has a structure:

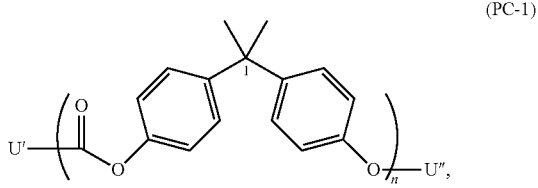
(PC-1)

wherein
n is a positive number having an average value greater than 1,
U' is a first polymer chain end group, and
U" is a second polymer chain end group.

In this example, the moiety

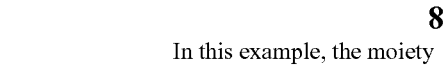

is a dioxy fragment of bisphenol A.

In an embodiment, the polycarbonate is a post-consumer poly(bisphenol A carbonate).

First and second end groups U' and U" of the polycarbonate can be any suitable end group, providing the end group does not adversely affect the formation of the PES. In an embodiment U' is

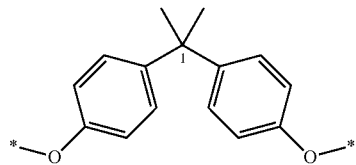 [SMILES: *Oc1ccc(C(C)(C)c2ccc(O*)cc2)cc1]

and U" is hydrogen.

The bis-aryl sulfone for forming a PES has a structure according to formula (4):

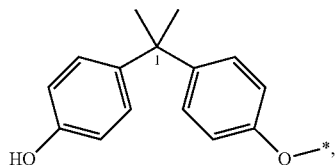
(4)

wherein
each E' is an independent monovalent radical selected from the group consisting of hydrogen and electron withdrawing groups, and
each X' is an independent monovalent leaving group.

Exemplary non-limiting electron withdrawing groups include nitro (*—$NO_2$), cyano (*—CN), trifluoromethyl (*—$CF_3$), trichloromethyl (*—$CCl_3$), and alkylsulfones (*—$S(=O)_2R^a$, wherein $R^a$ is an alkyl or aryl group comprising 1 to 10 carbons), and combinations thereof.

Exemplary non-limiting leaving groups include fluoride, chloride, bromide, iodide, trifluoromethoxy (*—$OCF_3$), trichloromethoxy (*—$OCCl_3$), and trifluoromethanesulfonyl (*—$OS(=O)_2CF_3$).

Exemplary non-limiting bases for forming a PES include alkyl ammonium hydroxides, alkyl ammonium carbonates, alkyl ammonium biscarbonates, alkylammonium borates, 1,5-diazabicyclo[4.3.0]non-5-ene(DBN), 1,6-diazabicyclo[5.4.0]undec-7-ene (DBU), 1,4-diazabicyclo[2.2.2]octane (DAB CO), 1,5,7-triaza-bicyclo[4.4.0]dec-5-ene (TBD), dimethylaminopyridine (DMAP), pyridine, trialkylamines, alkylammonium fluorides, (e.g., tetraalkylammonium fluorides), metal ion hydroxides, metal ion carbonates, and ammonium hydroxide. More specific metal ion hydroxides include alkali metal ion hydroxides and alkaline earth metal ion hydroxides. More specific metal ion carbonates include alkali metal ion carbonates and alkaline earth metal ion carbonates, including those of lithium ion, sodium ion, potassium ion, rubidium ion, and/or cesium ion. Useful alkaline earth metal ion hydroxides include those of magnesium ion, calcium ion, and/or barium ion. The hydrated form of the base can be used. The bases can be used singularly or in combination. In an embodiment the base comprises a carbonate group. In another embodiment, the base is potassium carbonate ($K_2CO_3$). The base can be used in an amount of about 0.05 to about 1.1 molar equivalents relative to the diaryl sulfone.

The solvent for forming a PES is preferably a polar aprotic solvent. Exemplary non-limiting polar aprotic solvents include dimethylformamide (DMF), dimethyl acetamide (DMA), dimethyl sulfoxide (DMSO), N-methyl pyrollidinone (NMP), N-cyclohexyl pyrollidinone (CHP), 1,3-dimethyl-2-imidazolidinone, hexamethyl phosphoramide (HMPA), hexamethyl phosphorous triamide (HMPT), tributyl phosphate, tricresyl phosphate (TCP), triphenyl phosphate (TPP), tributyl phosphate (TBP), N-(n-butyl) benzene sulfonamide, and N-ethyl toluene sulfonamide. In an embodiment, the solvent is N-cyclohexyl pyrollidinone (CHP).

The reaction mixture is heated at a temperature of about 150° C. to about 250° C. for about 1 hour to about 48 hours, thereby forming the PES. Preferably, the reaction is conducted using a stream of inert gas (e.g., nitrogen) to remove any volatile organic byproducts during the step growth polymerization. Consumption of the starting materials can be monitored using any suitable technique (e.g., proton nuclear magnetic resonance ($^1H$ NMR), infrared spectroscopy). Thus, the PES can be formed in a single pot and in a single step. The PES can be isolated and/or further purified as necessary using known techniques (e.g., precipitation).

In a particular embodiment, the base comprises a carbonate group having a charge of −2 and the base is used in an amount of 1.0 to 1.1 molar equivalents relative to the diaryl sulfone. The carbonate dianion ($CO_3^{-2}$) reacts with the backbone carbonyl group of the carbonate material, releasing carbon dioxide and an intermediate bis-alkoxide. The bis-alkoxide then undergoes a step growth polymerization with the diaryl sulfone to form the PES.

The PES has a structure in accordance with formula (5):

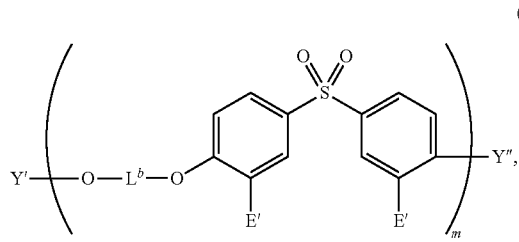

(5)

wherein
- m is a positive number greater having an average value greater than 1,
- each $L^b$ is an independent divalent linking group comprising 2 or more carbons,
- each E' is an independent monovalent radical selected from the group consisting of hydrogen and electron withdrawing groups,
- Y' is a first polymer chain end group, and
- Y" is a second polymer chain end group.

Y' and Y" can be any suitable end group. As a non-limiting example, Y' can be hydrogen and Y" can be an *—O—$L^b$—OH group (i.e., a residue of the diol portion of the initial polycarbonate). As another non-limiting example, Y' can be the bis-aryl sulfone residue:

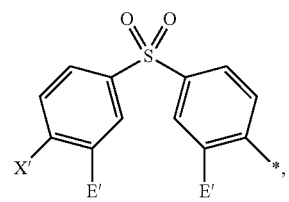

wherein X' is a leaving group and each E' is an electron withdrawing group, and Y'" can be an above-described leaving group X' of the bis-aryl sulfone.

Each $L^b$ of the PES can be an alkylene or an arylene group. When $L^b$ of the dioxy fragment *—O—$L^b$—O—* comprises an aromatic ring, the poly(ether sulfone) is referred to herein as a poly(arylene ether sulfone) (PAES). In an embodiment, $L^b$ comprises at least one aromatic ring. In another embodiment, *—O—$L^b$—O—* is a dioxy fragment of bisphenol A.

More specific poly(arylene ether sulfone)s have a structure in accordance with formula (6):

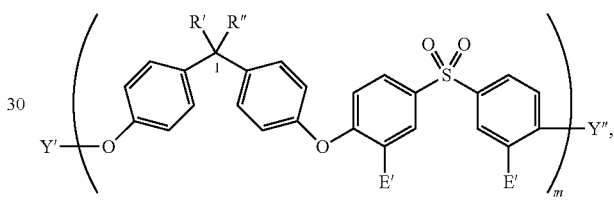

wherein
- m is a positive number having an average value greater than or equal to 1,
- R' is a monovalent radical selected from the group consisting of hydrogen, halides, and groups comprising 1 or more carbons,
- R" is a monovalent radical selected from the group consisting of hydrogen, halides, and groups comprising 1 or more carbons,
- each E' is an independent monovalent radical selected from the group consisting of hydrogen and electron withdrawing groups,
- Y' is a first polymer chain end group, and
- Y" is a second polymer chain end group.

In an embodiment, each E' is hydrogen. In another embodiment, R' is methyl and R" is methyl. In another embodiment, R' is trifluoromethyl and R" is trifluoromethyl. In another embodiment, R' is fluoride and R" is fluoride. In another embodiment, Y' is hydrogen and Y" has a structure according to formula (7):

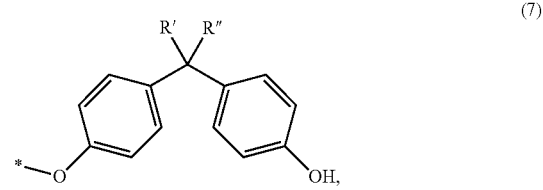

(7)

wherein
R' is a monovalent radical selected from the group consisting of hydrogen, halides, and groups comprising 1 or more carbons, and
R" is a monovalent radical selected from the group consisting of hydrogen, halides, and groups comprising 1 or more carbons.

The PES can have a number average molecular weight (Mn) of about 1000 to about 1,000,000, more specifically 1000 to about 100,000.

Poly(Ether Amide Sulfone) (PEAS)

The reaction mixture for preparing a poly(ether amide sulfone) (PEAS) comprises an ester material comprising two or more ester groups, an amino-alcohol compound comprising a one primary amine group and one hydroxy group, a bis-aryl sulfone, a diol compound that is substantially non-volatile at the reaction temperature, a base, and a solvent. The bis-aryl sulfone, the diol compound, the base, and the solvent can be an above-described bis-aryl sulfone, an above-described diol compound of formula (1), an above-described base, and an above-described solvent, respectively. It should be understood that the ester material, amino-alcohol, bis-aryl sulfone, diol compound, base, and solvent can be used singularly or in combination with one or more other respective ester materials, amino-alcohols, bis-aryl sulfones, diol compounds, bases, and solvents.

The reaction mixture for forming a PEAS comprises the ester material, the amino-alcohol, the diol compound, and the bis-aryl sulfone in a molar ratio of about 0.5:1.0:0.5:1.0, respectively. When the ester material is a polyester, the amount of polyester can be based on number average molecular weight (Mn) of the polyester.

The reaction mixture for forming a PEAS comprises the base in an amount of about 1.05 molar equivalents relative to bis-aryl sulfone.

The reaction mixture for forming a PEAS is conducted using a total solids concentration of about 15 wt % to about 25 wt % based on total weight of the reaction mixture.

Non-limiting examples of ester materials comprising two ester groups include dimethyl terephthalate (DMT), dimethyl phthalate (DMP), dimethyl isophthalate, bis(2-hydroxyethyl) terephthalate, combinations of the foregoing, and the like.

The ester material can be a polyester. Non-limiting exemplary polyesters include those having a repeat unit represented by formula (8):

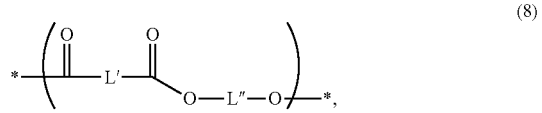

(8)

wherein
L' is a divalent radical comprising 1 or more carbons, and
L" is a divalent radical comprising 2 or more carbons.

Non-limiting polyesters include those having a structure represented by formula (9):

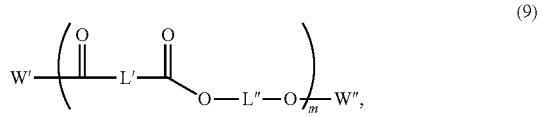

(9)

wherein
m is a positive number having an average value greater than 1,
W' is a first polymer chain end group,
W" is a second polymer chain end group,
L' is a divalent radical comprising 1 or more carbons, and
L" is a divalent radical comprising 2 or more carbons.

First and second end groups W' and W" of the polyester can be any suitable end groups, providing the end groups do not adversely affect the formation of the PEAS.

Preferably, L' comprises at least one aromatic ring and L" is an alkylene group comprising 2-4 carbons. For example, L" can be an ethylene group (*—CH$_2$CH$_2$—*) and/or a 1,4-butylene group (*—CH$_2$CH$_2$CH$_2$CH$_2$—*). Even more preferably, L' is phenylene and *—O-L"-O—* is a dioxy fragment of ethylene glycol and/or 1,4-butane diol. In a preferred embodiment, the polyester is selected from the group consisting of poly(ethylene terephthalate) (PET), poly(butylene terephthalate) (PBT)), and combinations thereof.

The reaction mixture to form a PEAS comprises an amino-alcohol. The amino-alcohol can have a structure according to formula (10):

$$HO\text{-}L^d\text{-}NH_2 \qquad (10),$$

wherein $L^d$ is a divalent radical comprising 2 or more carbons.

More specific amino-alcohols have a structure according to formula (11):

$$HO\text{-}L^e\text{-}CH_2\text{—}NH_2 \qquad (11)$$

wherein $L^e$ a divalent radical comprising 1 or more carbons. In an embodiment, $L^e$ comprises an aromatic ring.

More specific amino-alcohols have a structure according to formula (12):

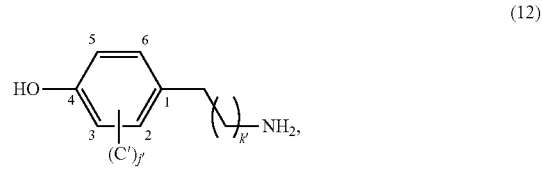

(12)

wherein
j' is an integer having a value of 0 to 4,
k' is an integer having a value of 0 or more, and
each C' is an independent monovalent radical selected from the group consisting of halides and substituents comprising 1 or more carbons.

It should be understood that each carbon labeled 2, 3, 5 and 6 of the aromatic ring of formula (12) is linked to hydrogen when not bound to a C' group.

An even more specific amino-alcohol is tyramine (Tyr):

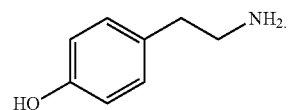

The reaction mixture to form a PEAS comprises a diol compound of formula (1), HO-L$^a$-OH, which is substantially non-volatile at the reaction temperature used to form the PEAS. Preferably, the diol compound comprises at least one aromatic alcohol. The diol compound can be an above-named diol compound. Poly(ether amide sulfone)s prepared from aromatic diol compounds are also referred to herein as poly(arylene ether amide sulfone)s (PAEAS).

Preferably, the diol compound has a structure according to formula (13):

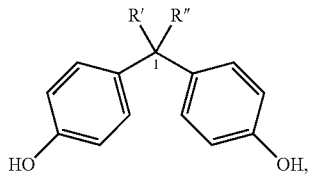

(13)

wherein
R' is a monovalent radical selected from the group consisting of hydrogen, halides and groups comprising 1 or more carbons, and
R" is a monovalent radical selected from the group consisting of hydrogen, halides and groups comprising 1 or more carbons.
R' and R" can together complete a ring that includes carbon labeled 1.
In an embodiment, R' is methyl and R" is methyl (bisphenol A, (BPA)).

The reaction mixture comprising the ester material, amino-alcohol, diol compound, bis-aryl sulfone, base, and solvent is heated at a temperature of about 150° C. to about 250° C. for about 1 hour to about 48 hours, thereby forming a PEAS. Preferably, the reaction is conducted using a stream of inert gas (e.g., nitrogen) to remove volatile organic byproducts such as ethylene glycol (boiling point (BP)=197° C.) and 1,4-butanediol (BP=235° C.) during the step growth polymerization. Preferably, the diol compound of the PEAS reaction mixture is substantially non-volatile at the reaction temperature, and therefore is not removed by the inert gas stream. Consumption of the starting materials can be monitored using any suitable technique (e.g., proton nuclear magnetic resonance ($^1$H NMR), infrared spectroscopy).

The primary amine group of the amino-alcohol compound selectively depolymerizes a polyester (PET and/or PBT), thereby releasing a volatile diol compound (e.g., ethylene glycol and/or butylene glycol, respectively) and generating a diol-diamide intermediate. The volatile diol can be removed by the inert gas stream and subsequently isolated by condensation for recycling purposes.

The diol-diamide intermediate has a structure according to formula (14):

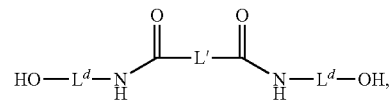

(14)

wherein
L' is a divalent radical comprising 1 or more carbons, and
each $L^d$ is an independent divalent radical comprising 2 or more carbons.

More specific diol-diamide intermediates have a structure according to formula (15):

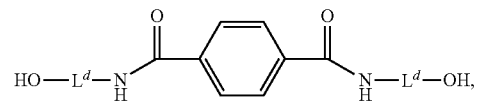

(15)

wherein
each $L^d$ is an independent divalent radical comprising 2 or more carbons.

In a second reaction, which can occur concurrently or subsequently to formation of the diol-diamide intermediate, alcohol groups of the non-volatile diol and diol-diamide selectively undergo a nucleophilic substitution reaction with bis-aryl sulfone, thereby forming a poly(ether amide sulfone) (PEAS). Thus, the PEAS can be formed in a single vessel and in a single heating step. The PEAS can be isolated and/or further purified as necessary using known techniques (e.g., precipitation).

The poly(arylene ether amide sulfone) (PEAS) has a structure in accordance with formula (16):

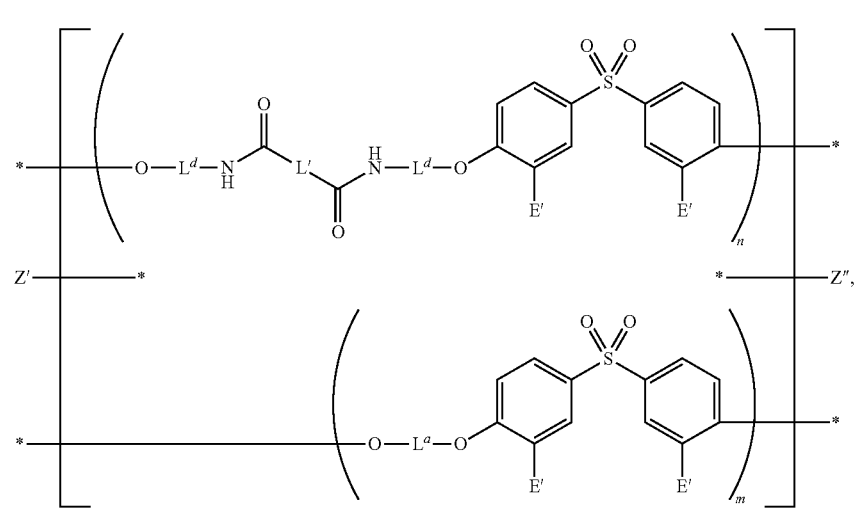

(16)

wherein
- n is a positive number having an average value greater than or equal to 1,
- m is a positive number having an average value greater than or equal to 1,
- each E' is an independent monovalent radical selected from the group consisting of hydrogen and electron withdrawing groups,
- each $L^a$ is an independent divalent radical comprising 2 or more carbons,
- each $L^d$ is an independent divalent radical comprising 2 or more carbons,
- each L' is an independent divalent linking group comprising 1 or more carbons,
- Z' is a first polymer chain end group, and
- Z" is a second polymer chain end group.

In the above notation, vertical stacking within the square brackets indicates a random distribution of the repeat units enclosed by the parentheses. Subscripts m and n represent average numbers of the repeat units, respectively. End groups Z' and Z" can be linked to any one of the vertically stacked repeat units.

More specific poly(ether amide sulfone)s are poly(arylene ether amide sulfone)s (PAEAS) having a structure in accordance with formula (17):

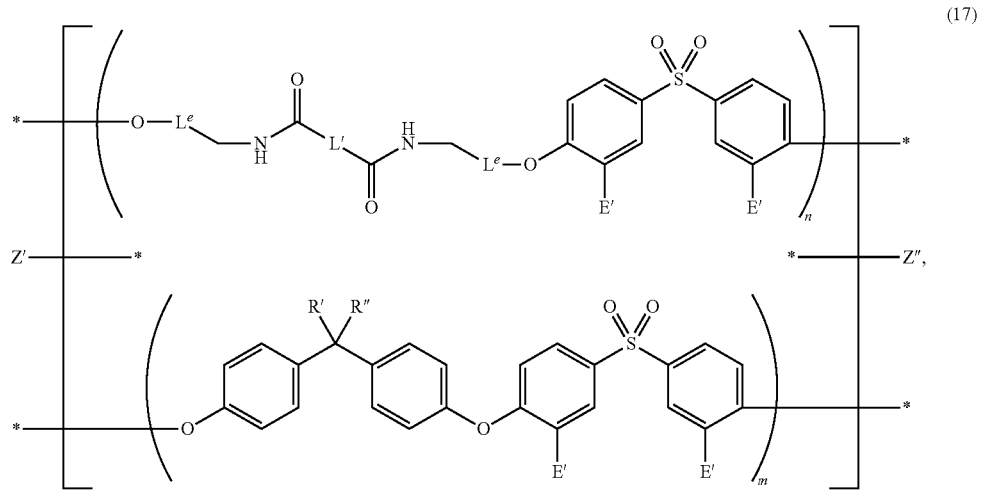

wherein
- n is a positive number greater than or equal to 1,
- m is a positive number greater than or equal to 1,
- each R' is an independent monovalent radical selected from the group consisting of hydrogen and groups comprising 1 or more carbons,
- each R" is an independent monovalent radical selected from the group consisting of hydrogen and groups comprising 1 or more carbons,
- each E' is an independent monovalent radical selected from the group consisting of hydrogen and electron withdrawing groups,
- each L' is an independent divalent linking group comprising 1 or more carbons,
- each $L^e$ is an independent divalent linking group comprising 1 or more carbons,
- Z' is a first polymer chain end group, and
- Z" is a second polymer chain end group.

Non-limiting first end groups Z' include hydrogen, and groups comprising at least one carbon.

Non-limiting second end groups Z" include leaving groups X' of the diaryl sulfone and groups comprising at least one carbon.

The PEAS can have a number average molecular weight (Mn) of about 5000 to about 1,000,000, more specifically 5,000 to about 50,000.

Commercial Utility

Poly(arylene ether sulfone)s, including the commercially available polysulfones, poly(ether sulfone)s, poly(ether ether sulfone)s and poly(biphenyl ether sulfone)s have been valued for years because of their excellent thermal stability, along with their high tensile strength, outstanding toughness, high dimensional stability, high heat deflection temperature, inherent flame retardancy (combustion resistance without additives), and good environmental stress cracking resistance. Accordingly, poly(arylene ether sulfone)s have found application in numerous applications including electrical and electronic components such as connectors, sockets and trays, aircraft components such as interior panels and bags, pipe fittings and manifolds for plastic piping systems, and even friction-and-wear resistant components such as bushings, thrust washers, bearings, slides and gears.

Potential industrial applications include molding compositions, which can comprise the any of the above-described sulfone polymers and one or more optional additives. Additives include but are not limited to dyes, pigments, reinforcing agents, antioxidants, mold release agents, UV absorbers, stabilizers, lubricants, plasticizers, anti-static agents, blowing agents, flame retardants, and combinations of the foregoing.

The following examples illustrate the methods of forming the disclosed polymers.

EXAMPLES

Materials used in the following examples are listed in Table 1.

TABLE 1

| ABBREVIATION | DESCRIPTION | SUPPLIER |
|---|---|---|
| BPA | Bisphenol A | Sigma Aldrich |
| PET | Poly(ethylene terephthalate); bottles; Tg = 67-81° C. | Dasani |

TABLE 1-continued

| ABBREVIATION | DESCRIPTION | SUPPLIER |
|---|---|---|
| PBT | Poly(butylene terephthalate); bottles; Tg = 37-51° C. | Sigma Aldrich |
| PC-1 | Poly(bisphenol A carbonate); Tg = 147° C. | Sigma Aldrich |
| DMT | Dimethyl Terephthalate | Sigma Aldrich |
| ArF | Bis(4-Fluorophenyl)sulfone | Sigma Aldrich |
| K2CO3 | Potassium Carbonate | Sigma Aldrich |
| AP | 4-Aminophenol | Sigma Aldrich |
| Tyr | Tyramine | Sigma Aldrich |
| CHP | N-Cyclohexyl-2-Pyrrolidone | Sigma Aldrich |

Herein, Mn is the number average molecular weight, Mw is the weight average molecular weight, and MW is the molecular weight of one molecule.

Poly(bisphenol A carbonate) (PC-1) was used as received from Aldrich. Poly(ethylene terephthalate) (PET) flakes cut from waste Dasani bottles were dissolved in tetrachloroethane and precipitated in methanol. The precipitate was filtered, dried in a vacuum oven 80° C., and powdered with mortar and pestle prior to use. Poly(butylene terephthalate) (PBT) pellets purchased from Aldrich were dissolved in tetrachloroethane and precipitated in methanol. The precipitate was filtered, dried in a vacuum oven at 80° C., and powdered with mortar and pestle prior to use. Dimethyl terephthalate (DMT) was powdered with mortar and pestle and dried overnight in a vacuum oven at 80° C. prior to use. Bisphenol A (BPA) was recrystallized from ethanol and dried in a vacuum oven overnight at 80° C. prior to use. Bis(4-fluorophenyl) sulfone (ArF) was recrystallized from ethanol and dried in a vacuum oven overnight at 80° C. prior to use. Potassium carbonate (K$_2$CO$_3$) was ground with a mortar and pestle and dried in a vacuum oven at 80° C. prior to use. 4-Aminophenol was opened in a glovebox and used as received from Sigma Aldrich. Tyramine was opened in a glovebox and used as received from Sigma Aldrich.

d$_6$-DMSO and CDCl$_3$ were purchased from Cambridge Isotope Laboratories (CIL) and used as received. $^1$H NMR spectra were recorded on a Bruker Avance 400 spectrometer (400 MHz). Chemical shifts are reported in ppm from tetramethylsilane with the solvent resonance as the internal standard (CDCl$_3$: delta 7.26 ppm; d$_6$-DMSO: delta 2.50 ppm). Infrared (IR) spectra were recorded on a Thermo Nicolet Nexus 670 FT-IR Alpha spectrophotometer using a Nicolet OMNI-Sampler ATR Smart-Accessory, $v_{max}$ in cm$^{-1}$. Gel permeation chromatography (GPC) was performed in THF or DMF using a Waters system equipped with four 5 micrometer Waters columns (300 mm×7.7 mm) connected in series with an increasing pore size (100, 1000, 10$^5$, 10$^6$ Å), a Waters 410 differential refractometer, and a 996 photodiode array detector. The system was calibrated with polystyrene standards.

Polymer Preparations

In the following examples, E', E", Z', and Z" are independent polymer chain end groups. E' and E" of PET, PBT and PC-1 are residues of the diol used to prepare these materials. End groups Z' and Z" of the polymer products can be hydrogen (H), hydroxy (OH), fluoride (F), hydroxyethyleneoxy, hydroxybutyleneoxy, methoxy, and residue of BPA, and so on. Structures enclosed in parentheses within the square brackets represent a repeating unit. Vertical stacking of the repeat units within the square brackets indicates a random distribution of the repeat units within the polymer chain.

Example 1

Preparation of P-1 from DMT having 10 mole % amide containing repeat units (n'/(m'+n')×100%=10%).

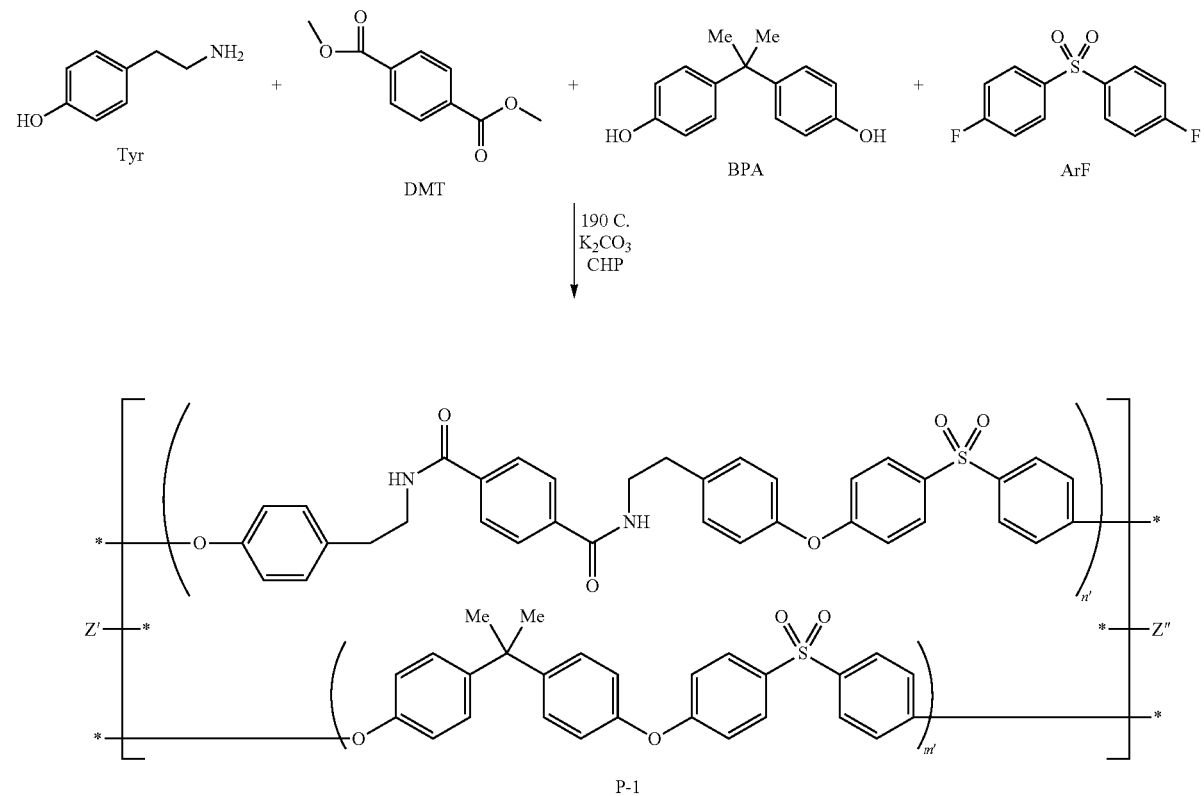

P-1

Tyramine (Tyr, 0.0275 g, 0.200 mmol, 0.2 equivalents), dimethyl terephthalate (DMT, 0.0194 g, 0.100 mmol, 0.1 equivalents), bisphenol A (BPA, 0.205 g, 0.900 mmol, 0.9 equivalents), bis(4-fluorophenyl)sulfone (ArF, 0.254 g, 1.0 mmol, 1.0 equivalents), potassium carbonate (0.150, 0.105 mmol, 1.05 equivalents), and N-cyclohexyl-2-pyrrolidone (CHP, 3.0 g) were weighed into a 2 Dram vial in a glovebox equipped with stirbar. The solids concentration was 22 wt % based on total weight of the mixture. The vial was capped and removed from the glovebox. A septum was attached to the vial and the vial was sealed with TEFLON tape and electrical tape. A nitrogen inlet needle and an exit needle were inserted into the septum to allow the solution to slowly concentrate at elevated temperature. The reaction was heated at 190° C. for 18 hours and allowed to cool. Methylene chloride (5 mL) was added to dissolve the crude polymer. The polymer solution was clear and viscous. The polymer was precipitated by addition of 15 mL of benchtop methanol at room temperature. The precipitate was filtered and dried in a vacuum oven overnight at 80° C. to yield 0.415 g of an off-white powder P-1 (90% yield); n'/(m'+n')×100%=10%. That is, the copolymer contained about 10 mole % of the amide-sulfone repeat unit having the subscript n', and about 90 mole % of the BPA-sulfone repeat unit having the subscript m'. Mn=11868, Mw=15,750, PDI=1.327. FIG. 1 is a $^1$H NMR spectrum of the product.

Example 2

Preparation of P-1 from PBT having 10 mole % amide containing repeat units (n'/(m'+n')×100%=10%).

Figure 2:
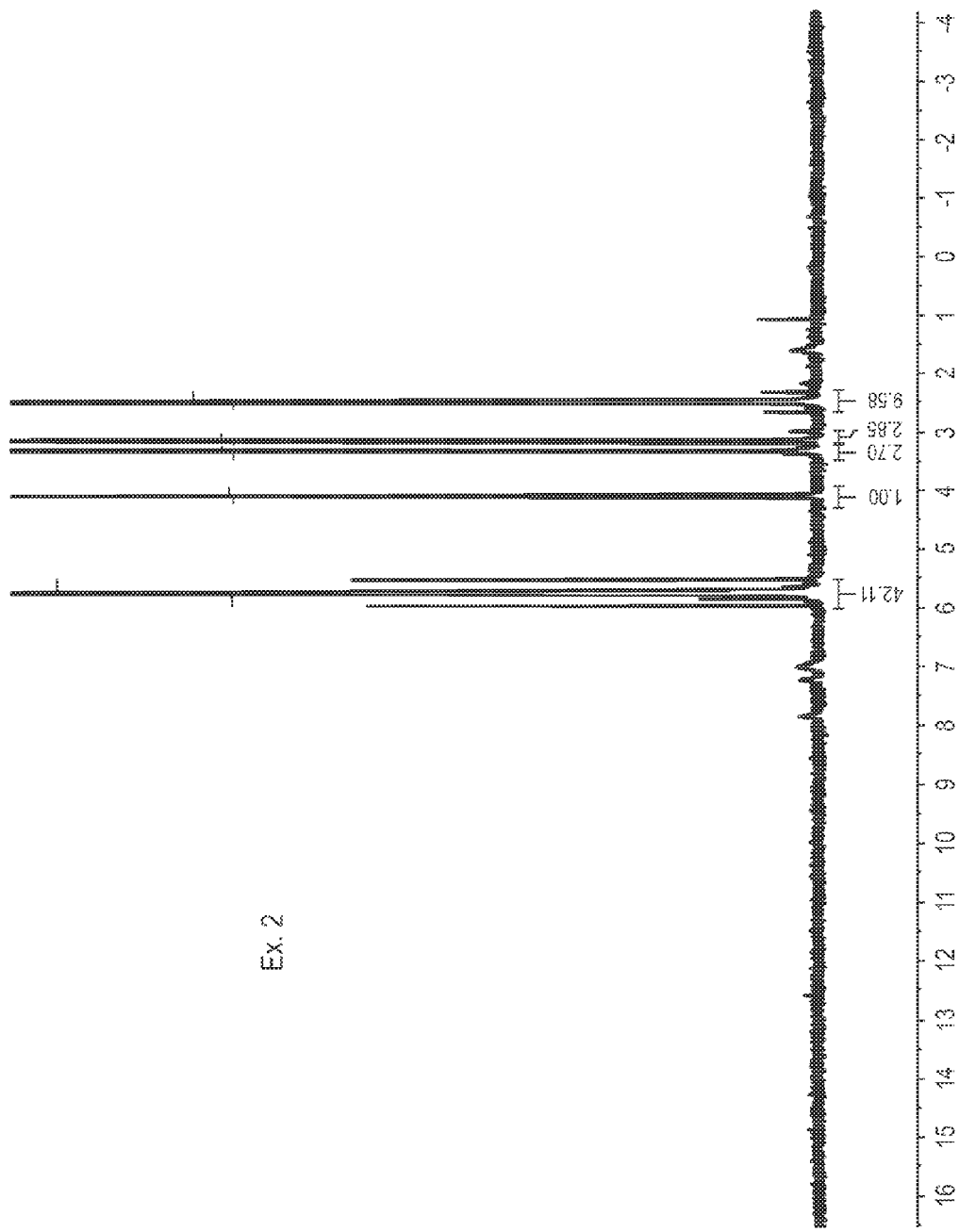
FIG. 2 is a $^1$H NMR spectrum of P-1 prepared from polyester PBT and Tyr (Example 2).

Tyramine (Tyr, 0.0275 g, 0.200 mmol, 0.2 equivalents), poly(butylene terephthalate) (PBT, 0.0192 g, 0.100 mmol, 0.1 equivalents, Mn=38000, n=172), bisphenol A (BPA, 0.205 g, 0.900 mmol, 0.9 equivalents), bis(4-fluorophenyl)sulfone (ArF, 0.254 g, 1.0 mmol, 1.0 equivalents), potassium carbonate (0.150 g, 0.105 mmol, 1.05 equivalents), and CHP (3.0 g) were weighed into a 2 Dram vial in the glovebox equipped with stirbar. The solids concentration was 22 wt % based on total weight of the mixture. The vial was capped and removed from the glovebox. A septum was attached to the vial and the vial was sealed with TEFLON tape and electrical tape. A nitrogen inlet needle and an exit needle were inserted into the septum to allow the solution to slowly concentrate at elevated temperature. The reaction was heated at 190° C. for 41 hours and allowed to cool. Methylene chloride (5 mL) was added to dissolve the crude polymer. The polymer solution was clear and viscous. The polymer was precipitated by addition of 15 mL of benchtop methanol at room temperature. The precipitate was filtered and dried in a vacuum oven overnight at 30° C. to yield 0.245 g of an off-white powder P-1 (57% yield; n'/(m'+n')×100%=10%). Mn=71,928, Mw=129,552, PDI=1.80. FIG. 2 is a $^1$H NMR spectrum of the product. The higher molecular weight polymer formed in Example 2 has limited solubility in DMSO, and therefore the solvent signals of FIG. 2 are more intense compared to the signals of FIG. 1.

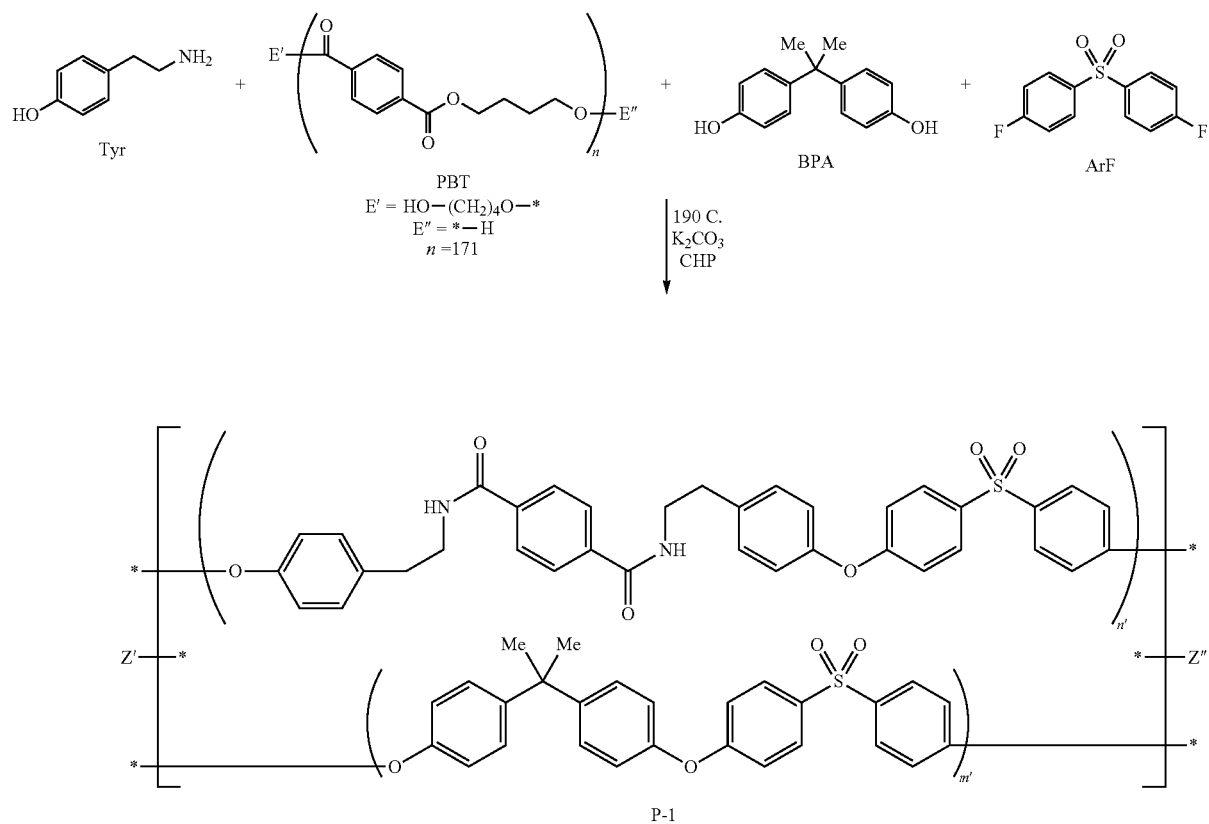

P-1

Example 3

Preparation of P-2 from Poly(Bisphenol a Carbonate) (PC-1)

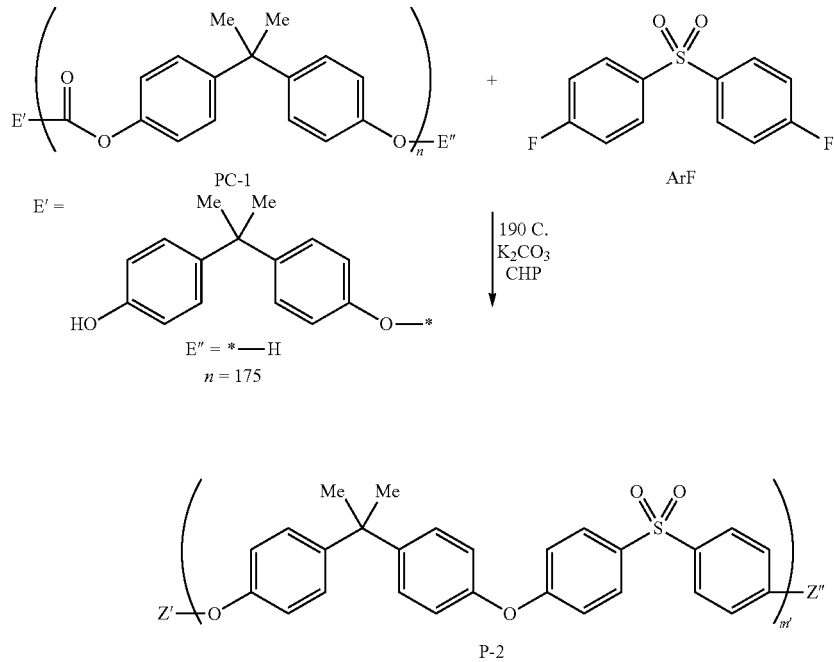

Figure 3:
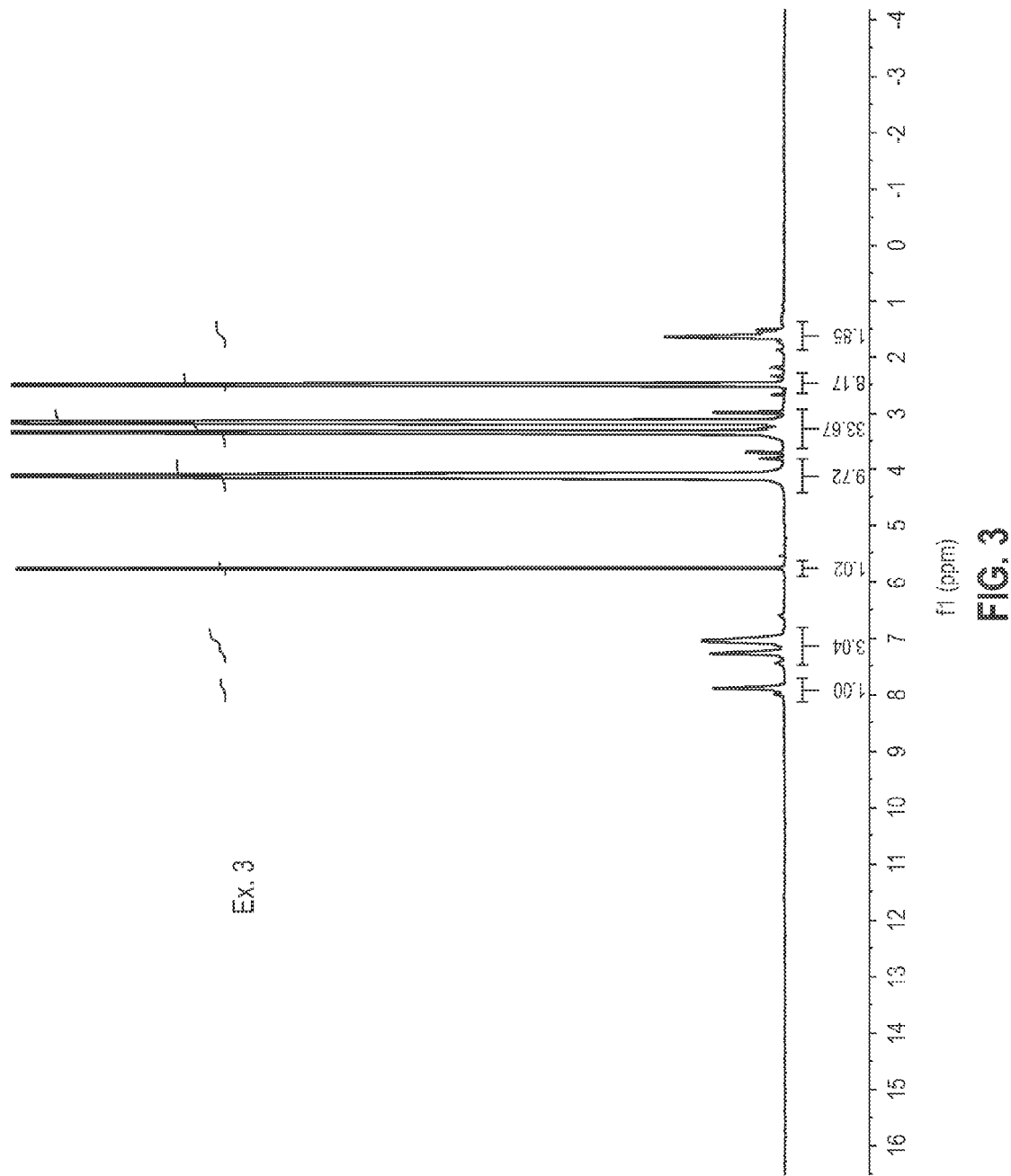
FIG. 3 is a $^1$H NMR spectrum of P-2 prepared from polycarbonate PC-1 (Example 3).

Poly(bisphenol A carbonate) (PC-1, 0.272 g, 0.200 mmol, 0.1 equivalents, Mw 45000, n=175), bis(4-fluorophenyl)sulfone (ArF, 0.254 g, 1.0 mmol, 1.0 equivalents), potassium carbonate (0.150 g, 0.105 mmol, 1.05 equivalents), and CHP (3.0 g) were weighed into a 2 Dram vial in the glovebox equipped with stirbar. The solids concentration was 18 wt % based on total weight of the mixture. The vial was capped and removed from the glovebox. A septum was attached to the vial and the vial was sealed with TEFLON tape and electrical tape. A nitrogen inlet needle and an exit needle were inserted into the septum to allow the solution to slowly concentrate at elevated temperature. The reaction was heated at 190° C. for 18 hours and allowed to cool. Methylene chloride (5 mL) was added to dissolve the crude polymer. The polymer solution was clear and viscous. The polymer was precipitated by addition of 15 mL of benchtop methanol at room temperature. The precipitate was filtered and dried in a vacuum oven overnight at 80° C. to yield 0.373 g of an off-white powder (94% yield). IR (thin film), $v_{max}$ in $cm^{-1}$: 3066 (w), 2967 (m), 2872 (w), 1586 (s), 1502 (s), 1488 (s), 1323 (m), 1294 (m), 1244 (s), 1169 (s), 1151 (s). Mn=7644, Mw=12450, PDI=1.63, m'=17. FIG. 3 is a $^1$H NMR spectrum of the product.

Example 4

Attempted preparation of P-3 from PET having 50 mole % amide containing repeat units (n'/(m'+n')×100%=50%).

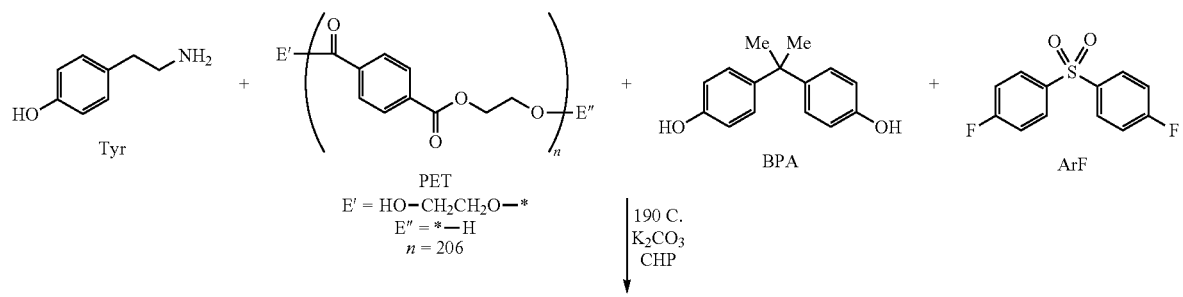

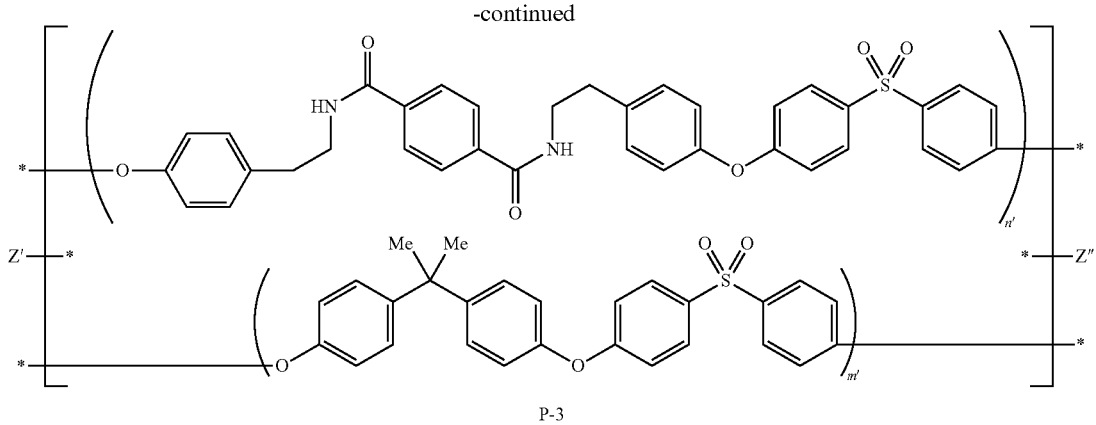

P-3

Tyramine (Tyr, 0.137 g, 1.00 mmol, 1.0 equivalents), poly(ethylene terephthalate) (PET, 0.0821 g, 0.500 mmol, 0.5 equivalents, Mn 40000, n=206), bisphenol A (BPA, 0.114 g, 0.500 mmol, 0.5 equivalents), bis(4-fluorophenyl)sulfone (ArF, 0.254 g, 1.0 mmol, 1.0 equivalents), potassium carbonate (0.150 g, 0.105 mmol, 1.05 equivalents), and CHP (3.0 g) were weighed into a 2 Dram vial in the glovebox equipped with stirbar. The solids concentration was 20 wt % based on total weight of the mixture. The vial was capped and removed from the glovebox. A septum was attached to the vial and the vial was sealed with TEFLON tape and electrical tape. A nitrogen inlet needle and an exit needle were inserted into the septum to allow the solution to slowly concentrate at elevated temperature. The reaction was heated at 190° C. for 44 hours and allowed to cool. Methylene chloride (5 mL) was added to dissolve the crude polymer. The polymer solution was clear and viscous. The polymer P-3 was precipitated by addition of 15 mL of benchtop methanol at room temperature. GPC analysis was performed in DMF eluent, however, due to the difficulty in filtering, the reported average molecular weight of the soluble polymer is likely lower than the overall molecular weight of the sample. For P-3, n'/(m'+n')×100%=50%. No other characterization of the polymer was obtained.

When the amount of the amide-sulfone repeat unit in the product polymers was 50 mole % or higher, the product polymers were difficult to process due to low solubility.

Therefore, copolymers were prepared containing 10 mole % to about 30 mole % of the amide-sulfone repeat unit and about 90 mole % to about 70 mole % of a BPA-sulfone repeat unit, which served as a diluent.

Example 5

Attempted preparation of P-3 from DMT having 50% amide groups (n'/(m'+n')×100%=50%).

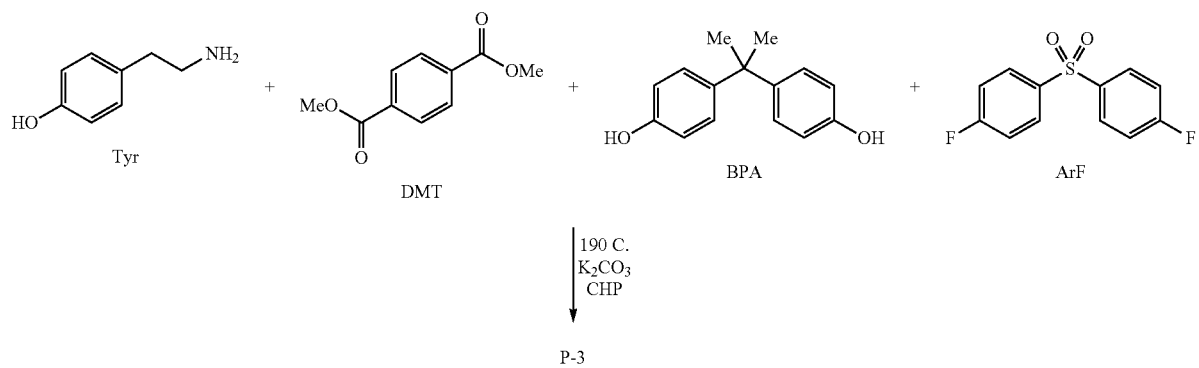

P-3

Tyramine (0.137 g, 1.0 mmol, 1.0 equivalents), dimethyl terephthalate (DMT, 0.097 g, 0.500 mmol, 0.5 equivalents), bisphenol A (0.114 g, 0.5 mmol, 0.5 equivalents), bis(4-fluorophenyl)sulfone (ArF, 0.254 g, 1.0 mmol, 1.0 equivalents), potassium carbonate (0.150 g, 0.105 mmol, 1.05 equivalents), and CHP (3.0 g) were weighed into a 2 Dram vial in the glovebox equipped with stirbar. The solids concentration was 20 wt % based on total weight of the mixture. The vial was capped and removed from the glovebox. A septum was attached to the vial and the vial was sealed with TEFLON tape and electrical tape. A nitrogen inlet needle and an exit needle were inserted into the septum to allow the solution to slowly concentrate at elevated temperature. The reaction was heated at 190° C. for 44 hours. The polymer was not isolated.

Example 6 (Comparative)

Preparation of P-4

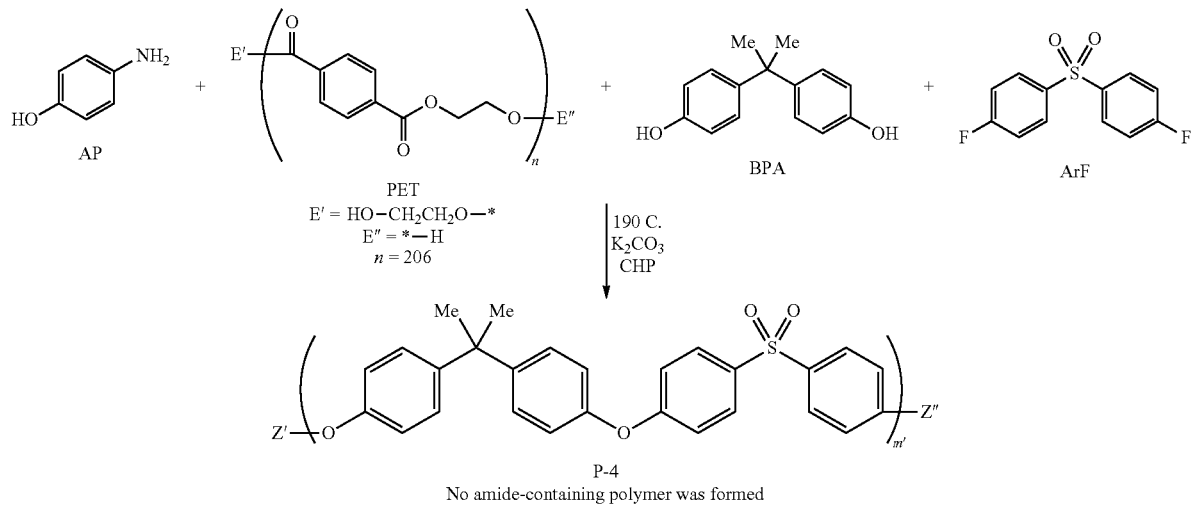

P-4
No amide-containing polymer was formed

Figure 4:
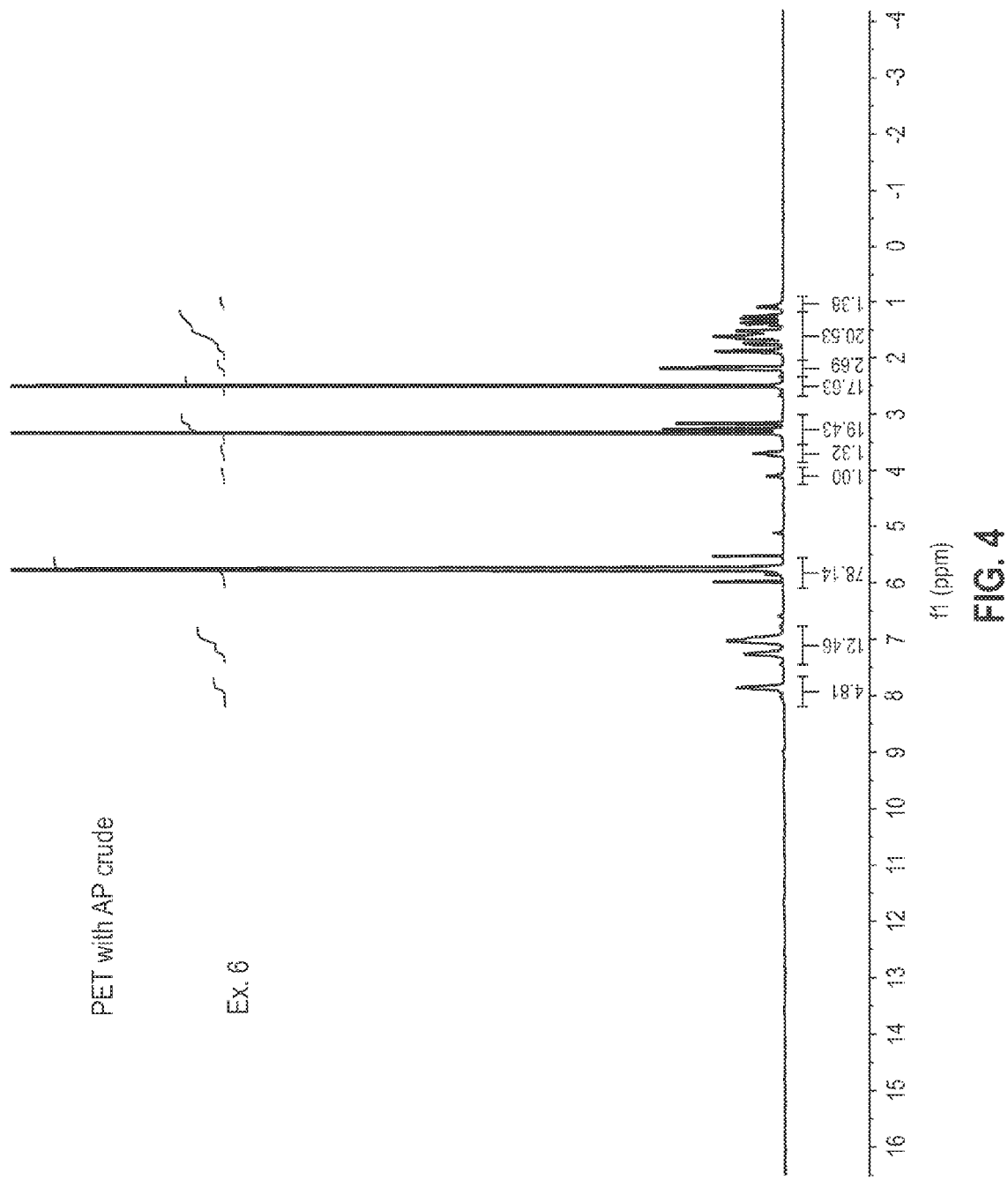
FIG. 4 is a $^1$H NMR spectrum of the crude product formed in Example 6.
Figure 5:
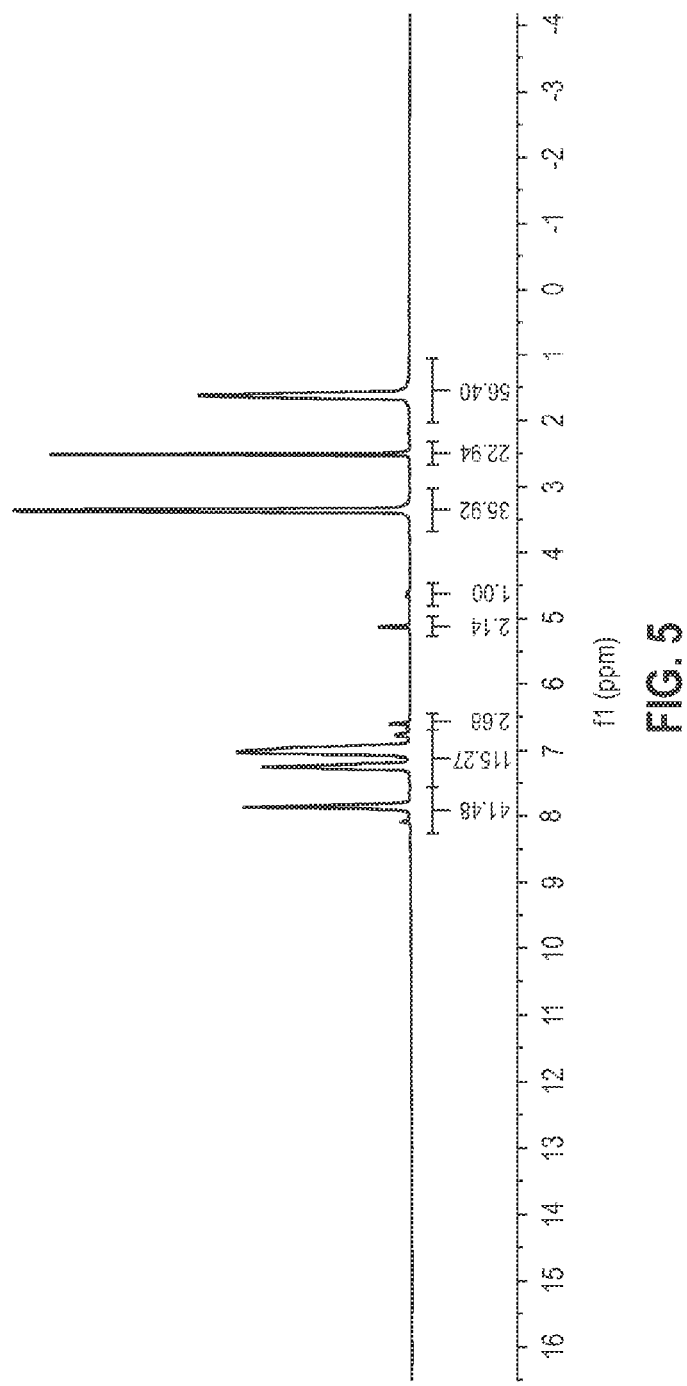
FIG. 5 is a $^1$H NMR spectrum of the purified product formed in Example 6.

4-Aminophenol (AP, 0.0275 g, 0.200 mmol, 0.2 equivalents), poly(ethylene terephthalate) (PET, 0.0161 g, 0.200 mmol, 0.1 equivalents.), bisphenol A (BPA, 0.205 g, 0.900 mmol, 0.9 equivalents), Bis(4-fluorophenyl)sulfone (ArF, 0.254 g, 1.0 mmol, 1.0 equivalents), potassium carbonate (0.150 g, 0.105 mmol, 1.05 equivalents), and CHP (3.0 g) were weighed into a 2 Dram vial in the glovebox equipped with stirbar. The solids concentration was 18 wt % based on total weight of the mixture. The vial was capped and removed from the glovebox. A septum was attached to the vial and the vial was sealed with TEFLON tape and electrical tape. A nitrogen inlet needle and an exit needle were inserted into the septum to allow the solution to slowly concentrate at elevated temperature. The reaction was heated at 190° C. for 18 hours and allowed to cool. Methylene chloride (5 mL) was added to dissolve the crude polymer. The polymer solution was clear and viscous. The polymer was precipitated by addition of 15 mL of benchtop methanol at room temperature. The precipitate was filtered and dried in a vacuum oven overnight at 80° C. to yield 0.436 g of an off-white powder (99% yield, containing unreacted AP). Mn=7380 Mw=11341, PDI=1.53, m'~16. IR analysis showed no amide bonds. The AP did not appear to react at all. FIG. 4 is a $^1$H NMR spectrum of the crude product mixture containing P-4. The product structure is believed to be a BPA-poly aryl ether sulfone without amide functionality. FIG. 5 is a $^1$H NMR spectrum of the purified poly(arylene ether sulfone) product P-4.

Example 7 (Comparative)

Figure 6:
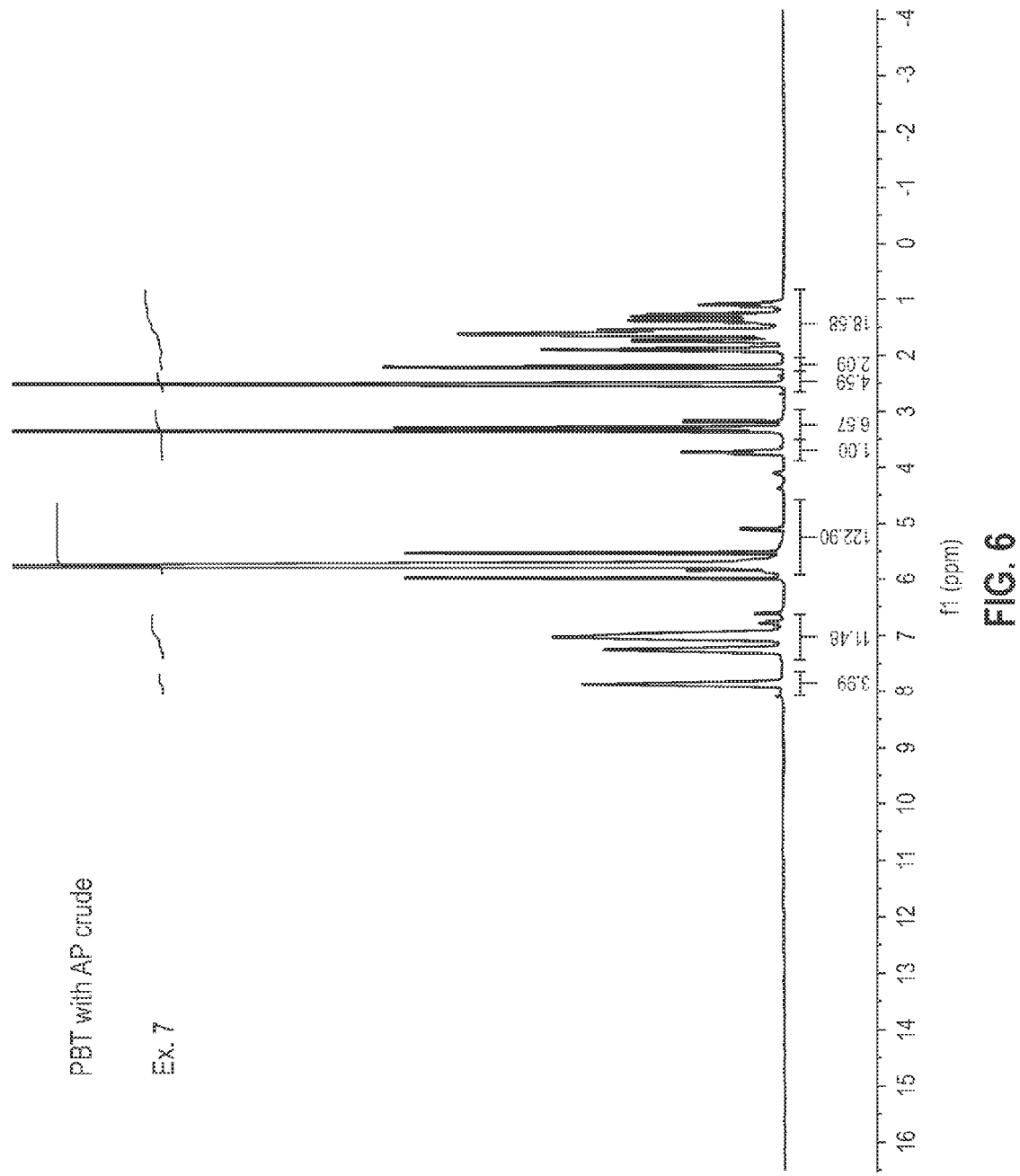
FIG. 6 is a $^1$H NMR spectrum of the crude product formed in Example 7.
Figure 7:
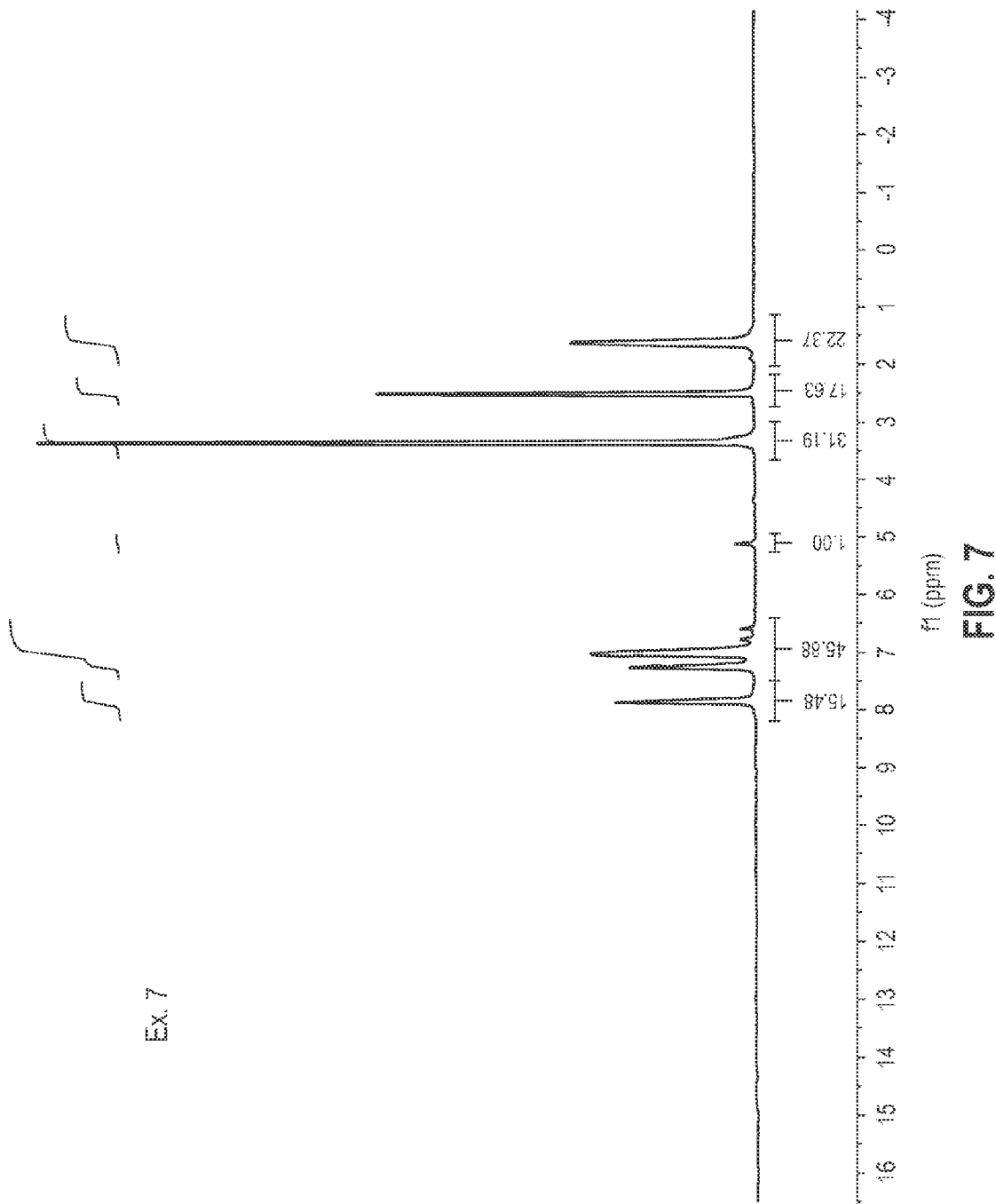
FIG. 7 is a $^1$H NMR spectrum of the purified product formed in Example 7.

Attempted reaction of AP with PBT. The procedure of Example 6 was repeated using PBT. As before, no amide bonds were detected in the polymer produced, indicating the AP was not incorporated. FIG. 6 is a $^1$H NMR spectrum of the crude product mixture. FIG. 7 is a $^1$H NMR spectrum of the isolated product.

Table 2 summarizes Examples 1 to 7. Number average molecular weights (Mn) and weight average molecular weight (Mw) were determined by gel permeation chromatography (GPC) using dimethyl formamide (DMF). Polymers were not fully soluble (presumably due to amide functionality), therefore the reported molecular weights are likely lower than actual.

TABLE 2

| Ex. | Reactants (equivalents) | Solvent | Time (h) | Temp (° C.) | Yield (%) | Mn (eluent) | Mw (eluent) | PDI (eluent) |
|---|---|---|---|---|---|---|---|---|
| 1 | DMT (0.1), Tyr (0.2), ArF (1.0), BPA (0.9), K$_2$CO$_3$ (1.05) | CHP | 18 | 190 | 90 | 11,475 (THF) | 17,925 (THF) | 1.56 (THF) |
| 2 | PBT (0.1), Tyr (0.2), ArF (1.0), BPA (0.9), K$_2$CO$_3$ (1.05) | CHP | 41 | 190 | 57 | 55,866 (THF) | 94,031 (THF) | 1.68 (THF) |
| 3 | PC-1 (1.0), ArF (1.0), K$_2$CO$_3$ (1.05) | CHP | 18 | 190 | 94 | 8,718 (THF) | 12,613 (THF) | 1.45 (THF) |

TABLE 2-continued

| Ex. | Reactants (equivalents) | Solvent | Time (h) | Temp (°C.) | Yield (%) | Mn (eluent) | Mw (eluent) | PDI (eluent) |
|---|---|---|---|---|---|---|---|---|
| 4 | PET (0.5), Tyr (1.0), ArF (1.0), BPA (0.5), $K_2CO_3$ (1.05) | CHP | 44 | 190 | ND | ND | ND | ND |
| 5 | DMT (0.5), Tyr (1.0), ArF (1.0), BPA (0.5), $K_2CO_3$ (1.05) | CHP | 44 | 190 | ND | ND | ND | ND |
| 6 (comp) | PET (0.1), AP (0.2), ArF (1.0), BPA (0.9), $K_2CO_3$ (1.05) | CHP | 23 | 190 | No AP incorporated | 7,380 | 11,341 | 1.54 |
| 7 (comp) | PBT (0.1), AP (0.2), ArF (1.0), BPA (0.9), $K_2CO_3$ (1.05) | CHP | 23 | 190 | No AP incorporated | 6,679 | 10,651 | 1.59 |

ND = not determined

Spectroscopic and thermal data for Examples 1-7 are listed in Table 3. Glass transition temperature (Tg) was measured by differential scanning calorimetry (DSC). Examples 6 and 7, which used 4-aminophenol (AP), showed no amide peak by FT-IR. That is, AP did not react with PET and PBT to form a diol-diamide intermediate.

TABLE 3

| Example. | Tg (° C.) | IR carbonyl peaks ($cm^{-1}$) (intensity) |
|---|---|---|
| 1 | 168 | 1723 (medium), 1654 (medium) |
| 2 | 217 | 1717 (weak), 1675 (strong) |
| 4 | | |
| 5 | | |
| 6 (comp) | 169 | 1721 (medium) |
| 7 (comp) | 171 | 1717 (medium |

Example 8

Single pot, 4-component reaction for the synthesis of amide-containing poly(aryl ether sulfone) from AP and DMT.

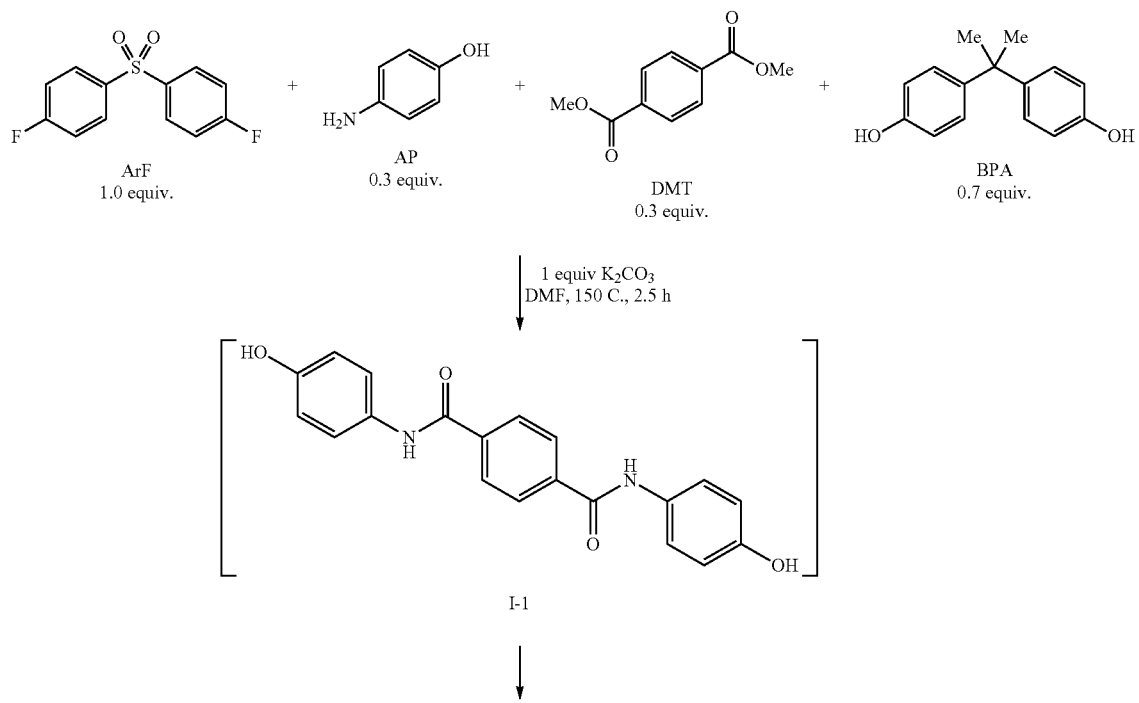

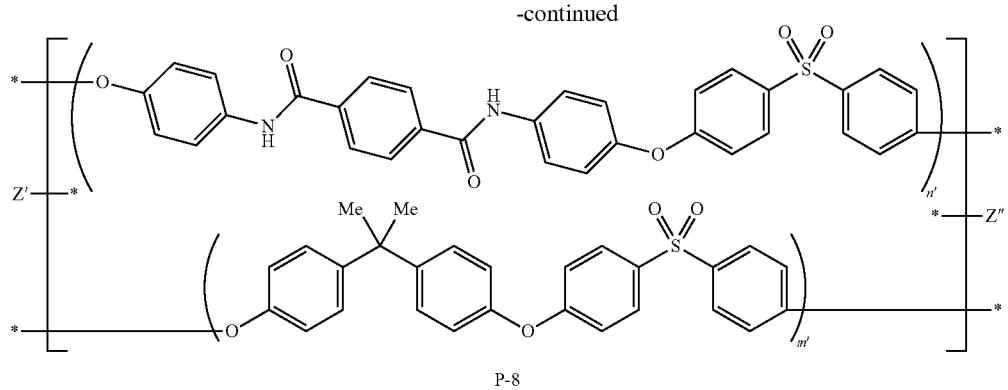

P-8

Figure 8:
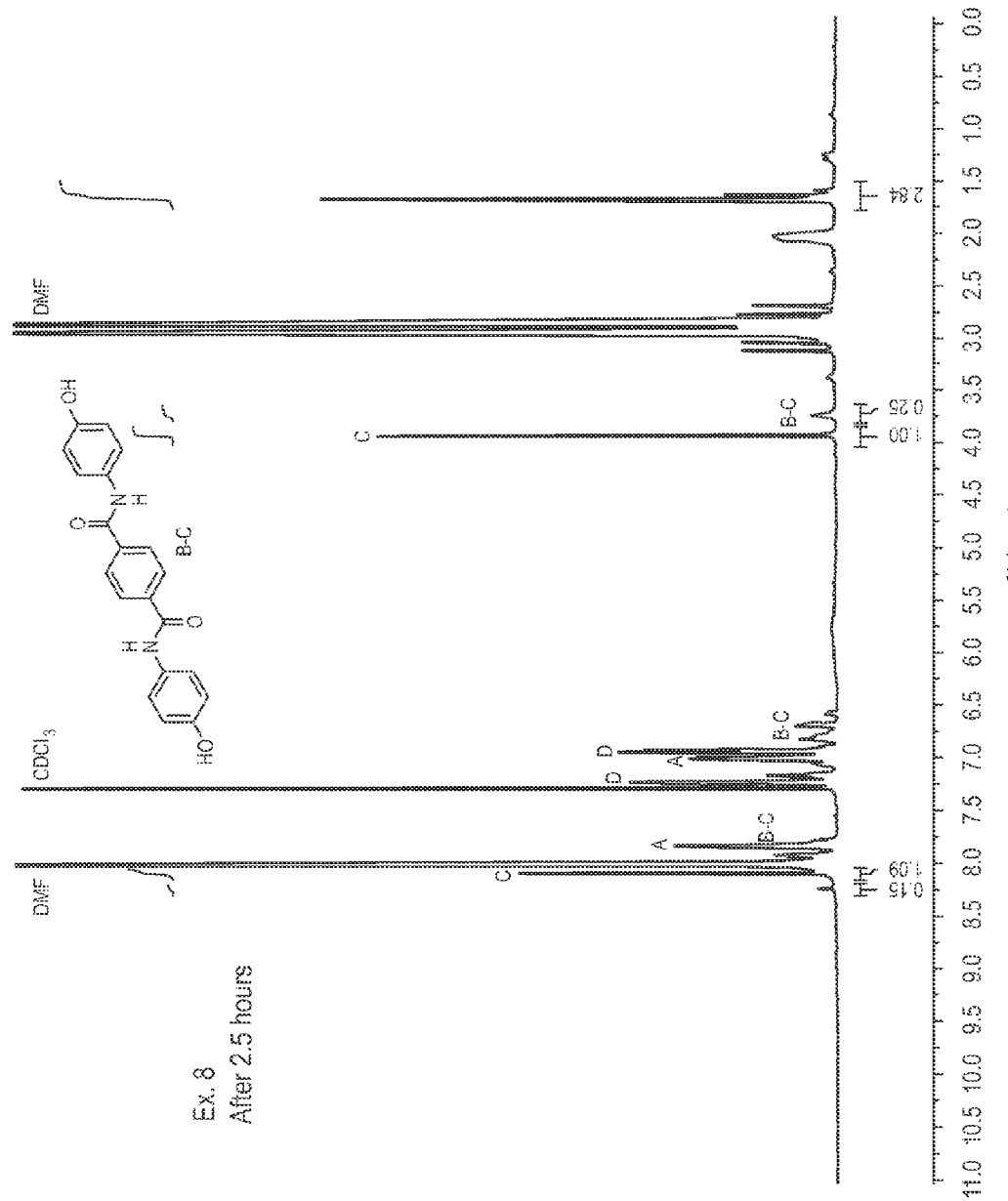
FIG. 8 is a $^1$H NMR spectrum of the reaction mixture of Example 8 after 2.5 hours, showing the presence of compound I-1.

4-Aminophenol (AP, 0.0654 g, 0.600 mmol, 0.6 equivalents), dimethyl terephthalate (DMT, 0.0582 g, 0.300 mmol, 0.3 equivalents), bisphenol A (BPA, 0.205 g, 0.900 mmol, 0.9 equivalents), bis(4-fluorophenyl)sulfone (ArF, 0.254 g, 1.0 mmol, 1.0 equivalents), potassium carbonate (0.138 g, 1.00 mmol, 1.00 equivalents), and DMF (2.02 mL) were weighed into a 2 Dram vial in the glovebox equipped with stirbar. The solids concentration was 25 wt % based on total weight of the mixture. The vial was capped and removed from the glovebox. A septum was attached to the vial and the vial was sealed with TEFLON tape and electrical tape. A nitrogen inlet needle and an exit needle were inserted into the septum to allow the solution to slowly concentrate at elevated temperature. The reaction was followed by $^1$H NMR. 4-Aminophenol was consumed first within 2.5 hours in the reaction with DMT. New $^1$H NMR signals were seen corresponding to a new amide-containing bisphenol intermediate I-1. FIG. 8 is a $^1$H NMR spectrum of the reaction mixture containing I-1. These data suggested that amidation was kinetically favored over reaction of BPA with diaryl sulfone ArF, and as a result, both requisite bisphenol monomers (I-1 and BPA) were present in the reaction solution prior to the ether-forming aromatic nucleophilic substitution reaction ($S_NAr$) resulting in the product polymer. The reaction was heated at 150° C. for 18 hours and allowed to cool. The polymer was precipitated by addition of 15 mL of benchtop methanol at room temperature. The precipitate was filtered and dried in a vacuum oven overnight at 80° C. to yield 0.251 g of an off-white powder (56% yield).

Figure 9:
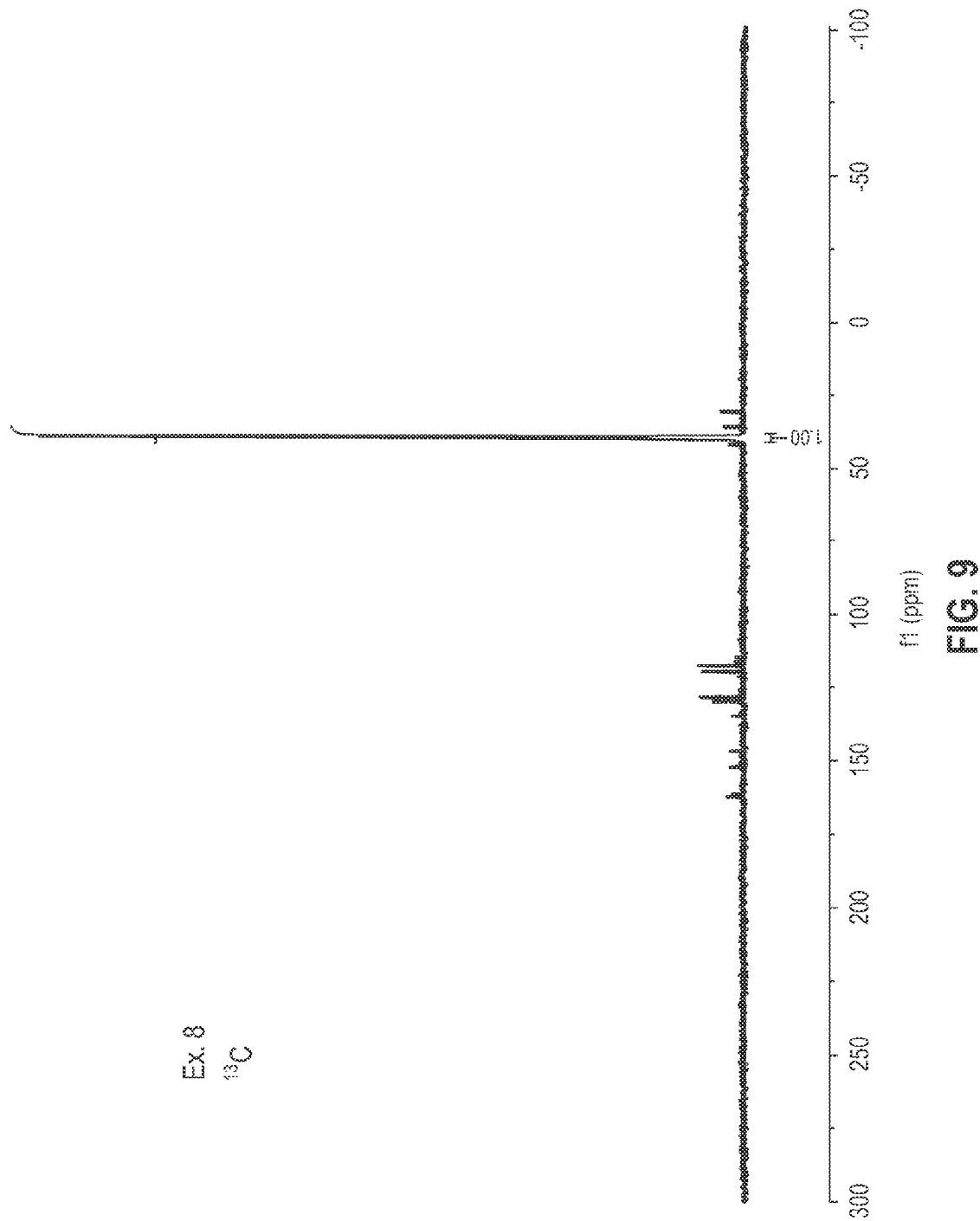
FIG. 9 is a $^{13}$C NMR spectrum of P-8 formed in Example 8.
Figure 10:
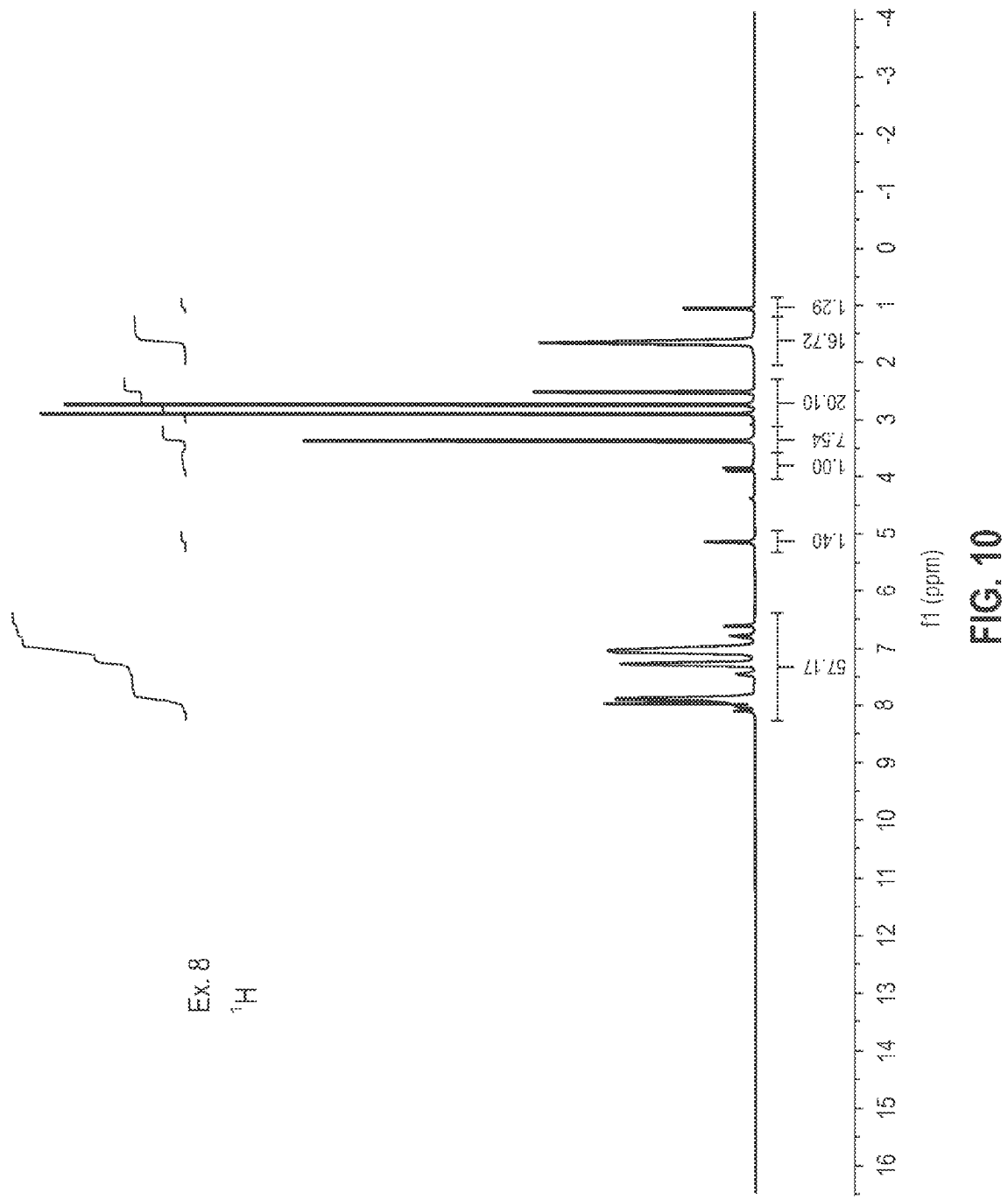
FIG. 10 is a $^1$H NMR spectrum of P-8 formed in Example 8.
Figure 11:
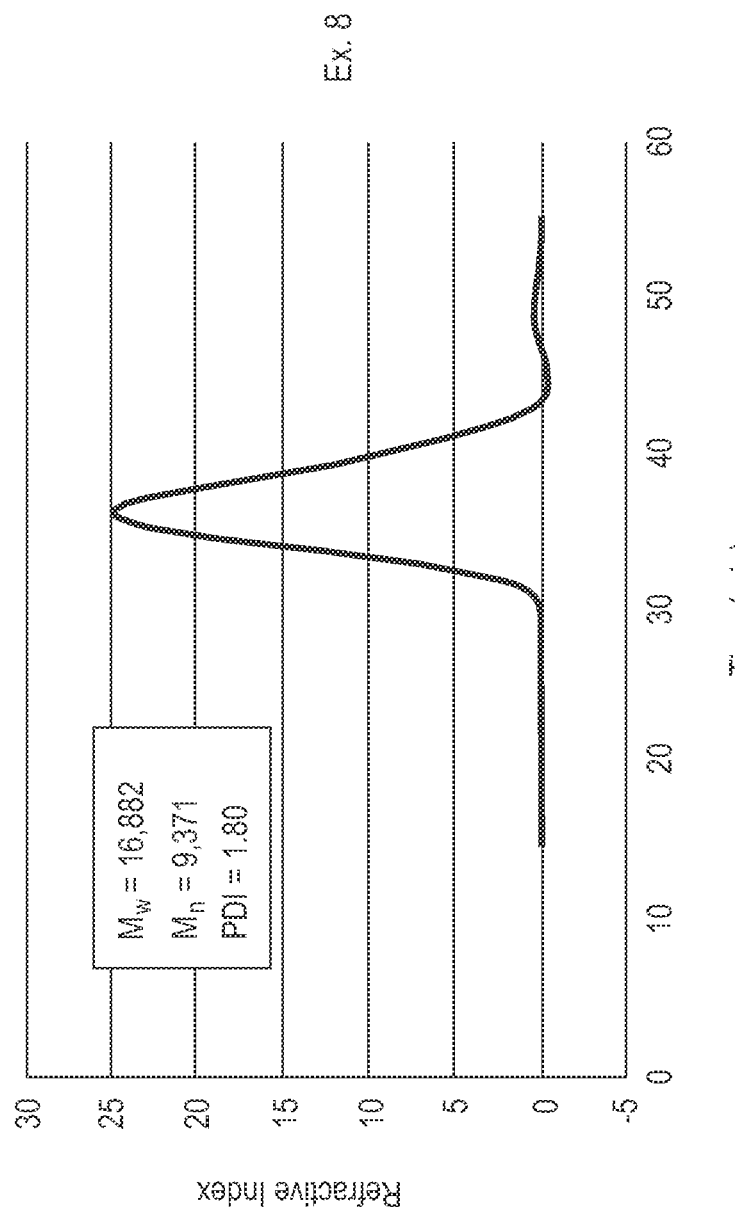
FIG. 11 is a gel permeation chromatography trace of the purified poly(arylene ether amide sulfone) formed in Example 8, having 30% amide incorporation.

The purified poly(arylene ether amide sulfone) P-8 was characterized by $^{13}$C (FIG. 9), $^1$H NMR (FIG. 10), and GPC (FIG. 11, n'/m'+n'×100%=30%, Mn=9371, Mw=16882, PDI=1.80). The product was identified as the desired poly(arylene ether amide sulfone) P-8 containing both amide and ether functionality.

P-8 was also prepared from separately synthesized I-1 as described below.

Example 9

Preparation of I-1 Monomer

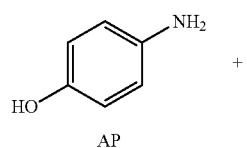
AP

Figure 12:
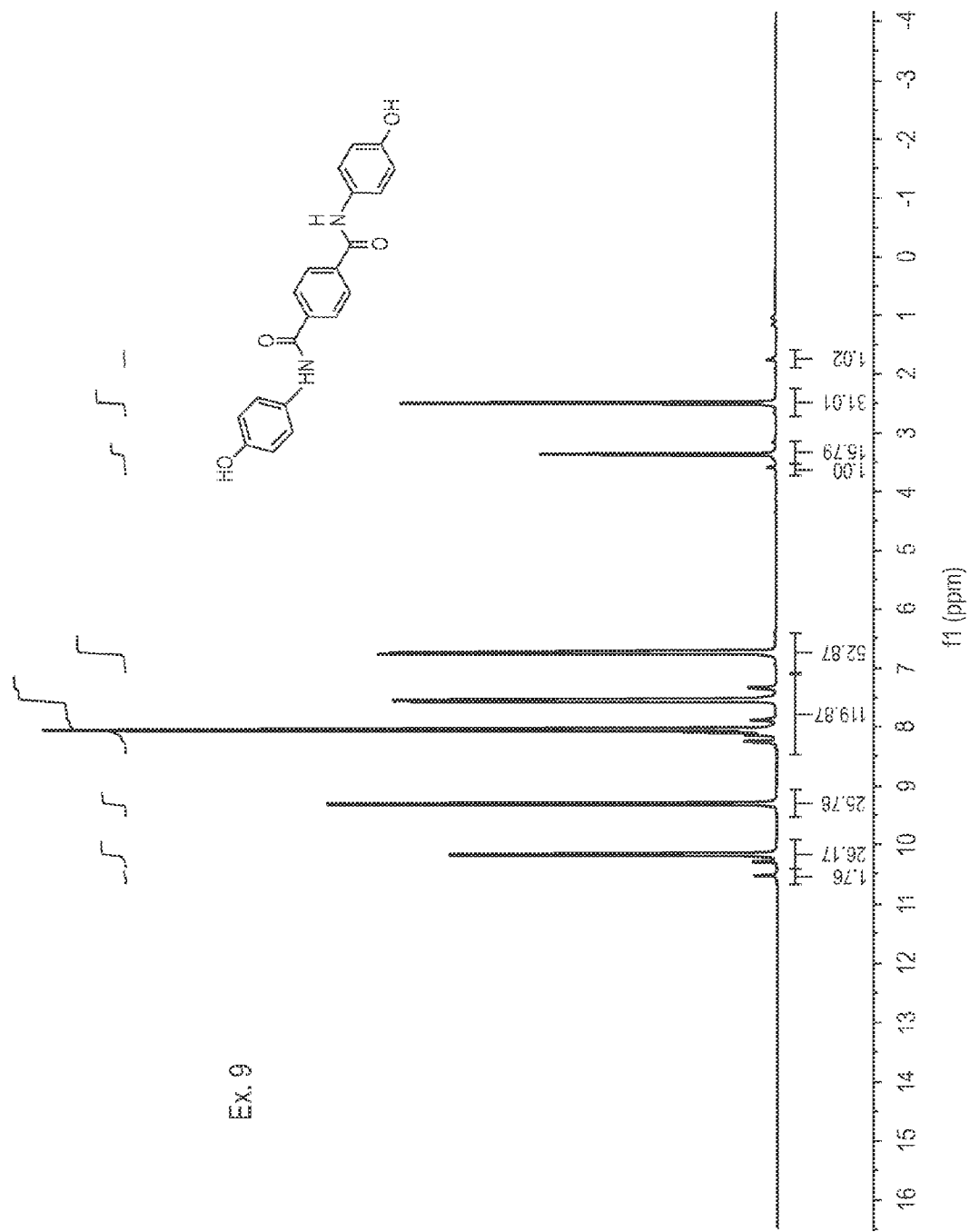
FIG. 12 is a $^1$H NMR spectrum of purified N$_1$,N$_4$-bis(4-hydroxyphenyl) terephthalamide monomer (I-1) prepared in Example 9.

Triethylamine (TEA, 5.4 mL, 40 mmol), tetrahydrofuran (THF, 100 mL), and of p-aminophenol (AP, 4.36 g, 40 mmol) were added to a 250-mL flask. CHCl$_3$ containing terephthaloyl dichloride (4.06 g, 20 mmol) was added dropwise to the solution with vigorous stirring at ambient temperature. The reaction was filtered to remove THF and CHCl$_3$. The filter cake was washed with a large amount of water and the solid material then vacuum dried to yield 6.2 grams of pure N$_1$,N$_4$-bis(4-hydroxyphenyl)terephthalamide monomer (I-1). FIG. 12, $^1$H NMR: (400 MHz, d$_6$-DMSO): δ 10.18 (s, 2H), 9.33 (bs, 2H), 8.06 (s, 4H), 7.56 (d, J=8.2 Hz, 2H), 6.77 (d, J=8.2 Hz, 2H); $^{13}$C NMR (100 MHz, d$_6$-DMSO): δ 164.3, 153.9, 137.5, 130.5, 127.6, 122.4, 115.2.

Example 10

Preparation of P-8 from I-1

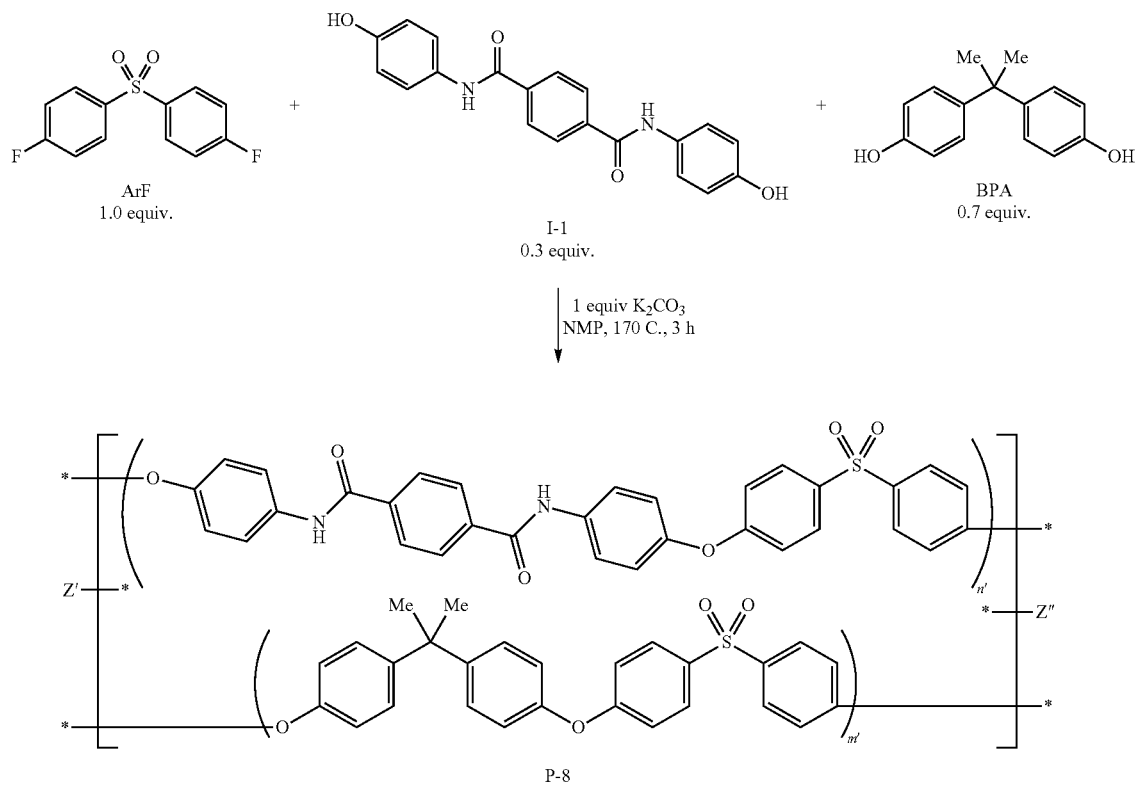

Figure 13:
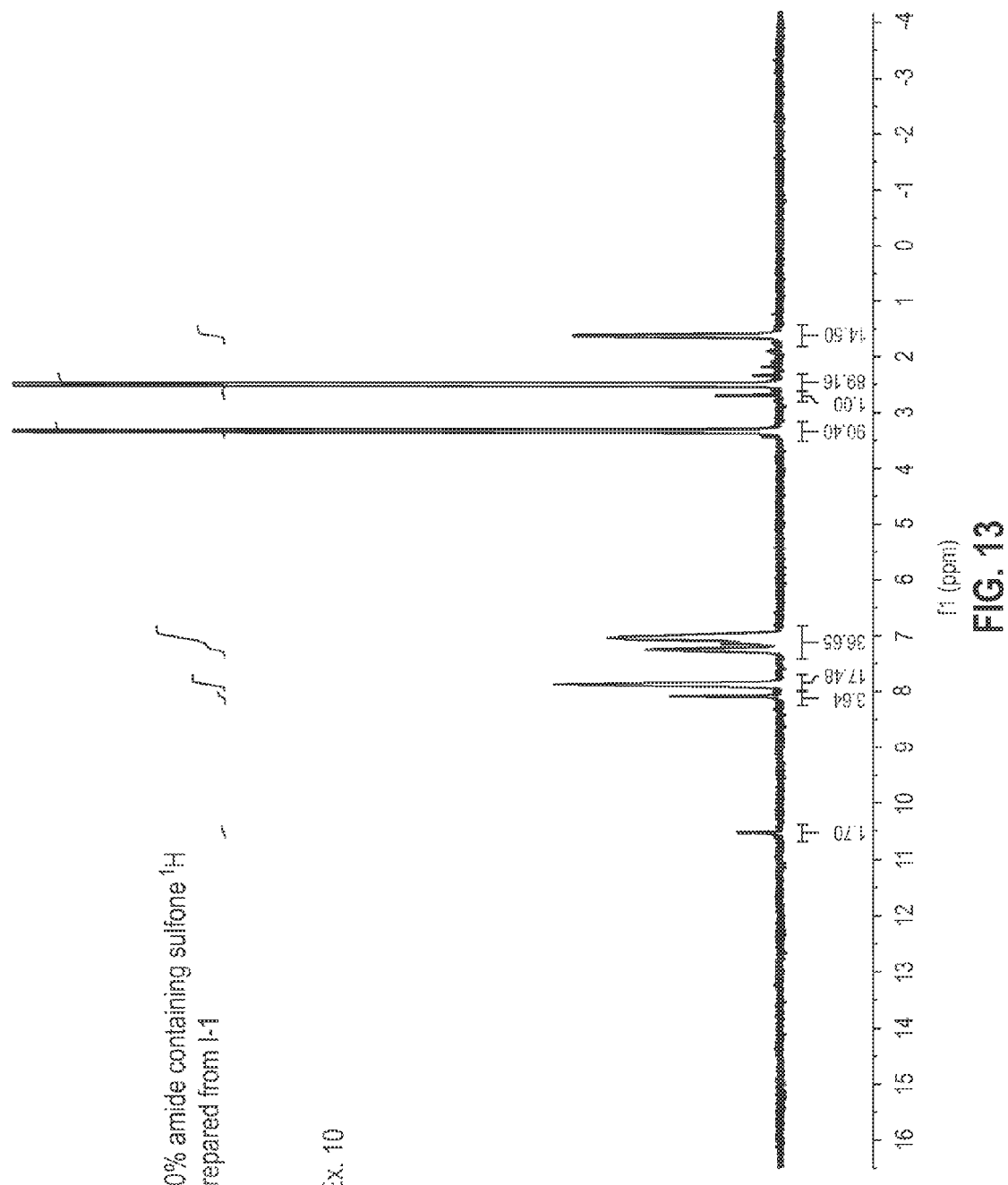
FIG. 13 is a $^1$H NMR spectrum of the polymer P-8 prepared in Example 10 using pre-formed I-1 prepared in Example 9.

To a 250-ml three-neck round bottom flask equipped with a stir bar, a Dean-Stark trap and a condenser, bis-amide monomer I-1 (0.547 g, 15.700 mmol), BPA (1.433 g, 6.280 mmol), ArF (2.000 g, 78.600 mmol), and $K_2CO_3$ (3.250 g, 23.580 mmol) were added. To this mixture NMP (15 ml) and toluene (65 ml) were added and the reaction was stirred for 10 minutes under a nitrogen atmosphere. The reaction setup was then placed in an oil-bath and the internal reaction temperature was set to 125° C. for 18 hours to azeotropically remove water from the reaction mixture. The reaction temperature was slowly increased to 170° C. over a period of four hours to completely remove the toluene. The reaction was then held at 170° C. for three hours at which point a dramatic increase in the viscosity was observed. The reaction was cooled to about 80° C. and was precipitated in deionized water. The polymer was stirred in water at 60° C. overnight followed, filtered, and stirred in methanol for four hours at 50° C. to ensure complete removal of NMP and water. The resulting polymer was filtered and dried under vacuum at 70° C. for 24 hours (FIG. 13, $^1$H NMR spectrum). $^1$H NMR (400 MHz, $d_6$-DMSO) δ: 1.60 ($CH_3$—C—$CH_3$, BPA), δ: (6.6-6.7, NH—Ar), δ: 7.01 (Ar, BPA), δ: 7.25, 7.80 ($SO_2$—Ar), δ: 8.08, δ: 10.45 (C=O—NH—Ar). $T_g$ (DSC)=224° C. $M_n$=62.1K, $M_w$=132.8K, PDI=2.13, n'/m'+n'×100%=30%, m'=90, n'=38.

Notably, the data obtained using the 4-component one-pot procedure of Example 8 were in agreement with data from Example 10 in which P-8 was synthesized from purified I-1 monomer (compare FIG. 13 with FIG. 10). Amide peaks can move depending on concentration of solvent. The remaining peaks that are unaffected by NMR conditions match.

In conclusion, complex random co-polymers were formed in one reaction vessel that involve multiple condensation reactions. This method provides access to a wide range of new, multi-component polymers as well as increased efficiency in the manufacture of current polymers of high commercial value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A poly(ether amide sulfone) (PEAS), having a structure in accordance with formula (16):

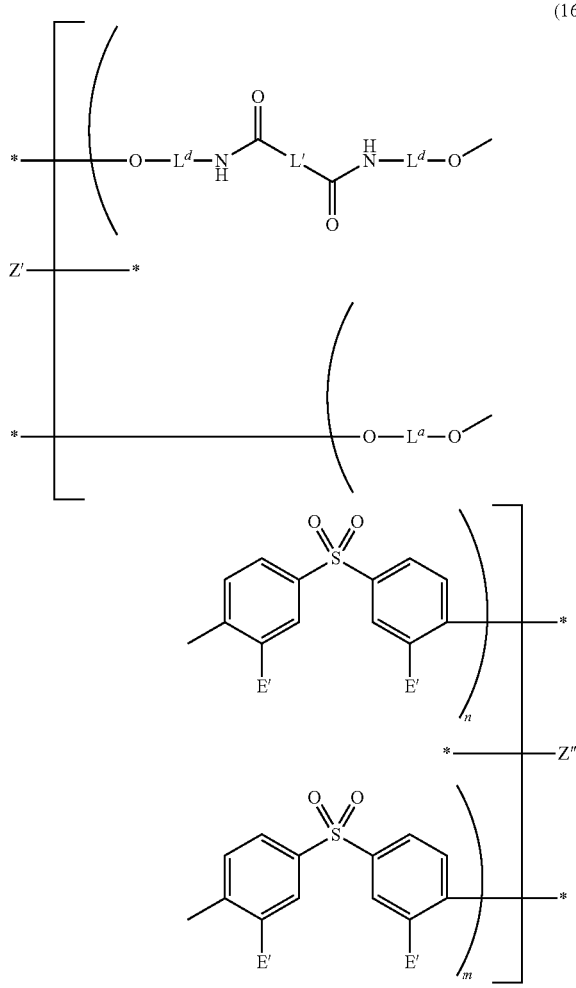

wherein
n is a positive number having an average value greater than or equal to 1,
m is a positive number having an average value greater than or equal to 1,
each E' is an independent monovalent radical selected from the group consisting of hydrogen and electron withdrawing groups,
each $L^a$ is an independent divalent radical comprising 2 or more carbons,
each *—O-$L^d$-NH—* group is an independent divalent radical wherein $L^d$ is *-$L^e$-CH$_2$—*, *—O-$L^d$-NH—* is *—O-$L^e$-CH$_2$—NH—*, and $L^e$ comprises an aromatic ring,
each L' is an independent divalent linking group comprising at least one aromatic ring,
Z' is a first polymer chain end group,
Z" is a second polymer chain end group, and
vertical stacking of the repeat units enclosed by parentheses within the square brackets indicates a random distribution of the repeat units in the structure of the PEAS.

2. The PEAS of claim 1, wherein each *—O-$L^d$—NH—* group is

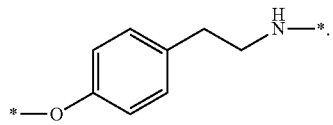

3. The PEAS of claim 1, wherein $L^a$ comprises an aromatic ring.
4. The PEAS of claim 1, wherein L' is phenylene.
5. The PEAS of claim 1, wherein *—O-$L^a$—O—* is a dioxy residue of bisphenol A.
6. The PEAS of claim 1, wherein each E' is hydrogen.
7. The PEAS of claim 1, wherein each E' is a nitro group.
8. A method, comprising:
forming a mixture comprising
i) a polyester having a repeat unit of formula (8):

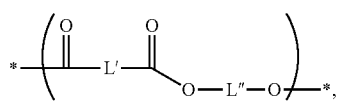

wherein
L' is a divalent radical comprising at least one aromatic ring, and
L" is a divalent radical comprising 2 or more carbons,
ii) an amino-alcohol of formula (11):

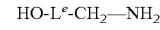

wherein $L_e$ comprises an aromatic ring,
iii) a bis-aryl sulfone of formula (4):

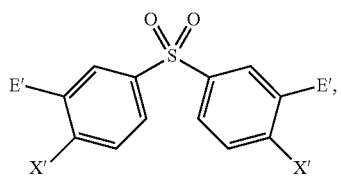

wherein
each E' is an independent monovalent radical selected from the group consisting of hydrogen and electron withdrawing groups, and
each X' is an independent monovalent leaving group,
iv) a diol compound of formula (1),

wherein
$L^a$ is a divalent radical comprising 2 or more carbons,
v) a base, and
vi) a solvent; and
heating the mixture at a reaction temperature of about 150° C. to about 250° C., wherein the diol compound is substantially non-volatile at the reaction temperature, thereby forming a poly(ether amide sulfone) (PEAS).

9. The method of claim 8, wherein the PEAS has a structure in accordance with formula (16):

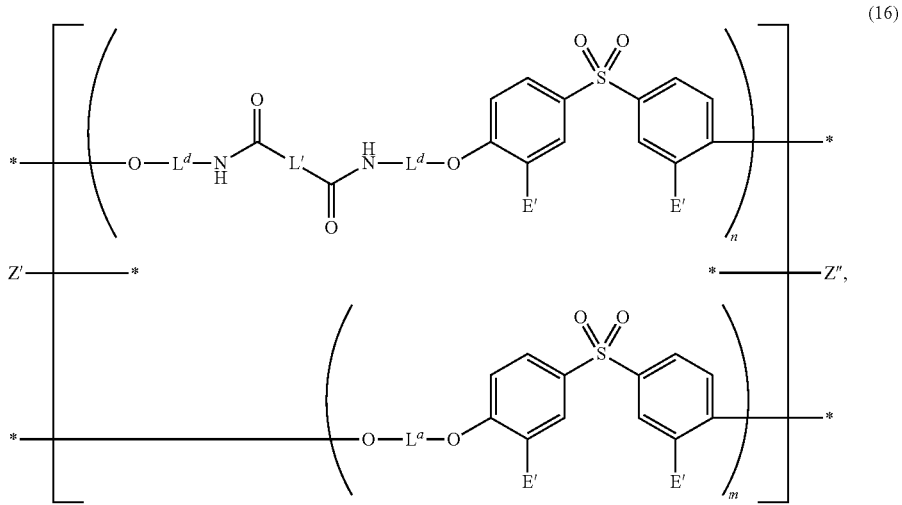

wherein
- n is a positive number having an average value greater than or equal to 1,
- m is a positive number having an average value greater than or equal to 1,
- each E' is an independent monovalent radical selected from the group consisting of hydrogen and electron withdrawing groups,
- each $L^a$ is an independent divalent radical comprising 2 or more carbons,
- each *—O-$L^d$-NH—* group is an independent divalent radical wherein $L^d$ is *-$L^e$-CH$_2$—*, *—O-$L^d$-NH—* is *—O-$L^e$-CH$_2$—NH—*, and $L^e$ comprises an aromatic ring,
- each L' is an independent divalent linking group comprising at least one aromatic ring,
- Z' is a first polymer chain end group,
- Z" is a second polymer chain end group, and
- vertical stacking within the square brackets of the repeat units enclosed by parentheses indicates random distribution of the repeat units in the structure of the PEAS.

10. The method of claim 8, wherein the polyester is selected from the group consisting of poly(ethylene terephthalate) (PET), poly(butylene terephthalate) (PBT), and combinations thereof.

11. The method of claim 8, wherein the polyester is a post-consumer polyester.

12. The method of claim 9, wherein each *—O-$L^d$-NH—* group is

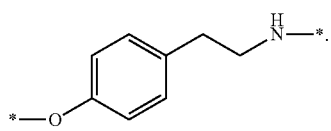

13. The method of claim 8, wherein L' is phenylene.

14. The method of claim 8, wherein the amino-alcohol has a structure according to formula (12):

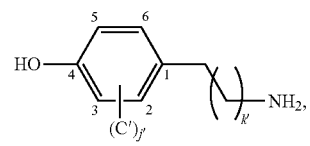

wherein
- j' is an integer having a value of 0 to 4,
- k' is an integer having a value of 0 or more, and
- each C' is an independent monovalent radical selected from the group consisting of halides and substituents comprising 1 or more carbons.

15. A molding composition comprising the PEAS of claim 1 and one or more optional additives.

16. A method, comprising:
forming a mixture comprising
i) an ester material comprising two ester groups,
ii) an amino-alcohol of formula (11):

$$HO\text{-}L^e\text{-}CH_2\text{—}NH_2 \quad (11)$$

wherein $L^e$ comprises an aromatic ring,
iii) a bis-aryl sulfone of formula (4):

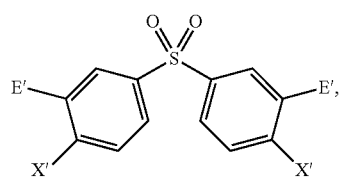

wherein
  each E' is an independent monovalent radical selected from the group consisting of hydrogen and electron withdrawing groups, and
  each X' is an independent monovalent leaving group,
iv) a diol compound of formula (1), HO-L$^a$—OH  (1), wherein
  L$^a$ is a divalent radical comprising 2 or more carbons,
v) a base, and
vi) a solvent; and
  heating the mixture at a reaction temperature of about 150° C. to about 250° C., wherein the diol compound is substantially non-volatile at the reaction temperature, thereby forming a poly(ether amide sulfone) (PEAS).

17. The method of claim 16, wherein the compound comprising two ester groups is a diester of terephthalic acid.

* * * * *